(12) United States Patent
Zheng

(10) Patent No.: US 6,499,498 B1
(45) Date of Patent: *Dec. 31, 2002

(54) COLLAPSIBLE STRUCTURES HAVING OVERLAPPING SUPPORT LOOPS

(75) Inventor: Yu Zheng, Covina, CA (US)

(73) Assignee: Patent Category Corp., Walnut, CA (US)

(*) Notice: Subject to any disclaimer, the term of this patent is extended or adjusted under 35 U.S.C. 154(b) by 25 days.

This patent is subject to a terminal disclaimer.

(21) Appl. No.: 09/696,909

(22) Filed: Oct. 26, 2000

Related U.S. Application Data

(63) Continuation-in-part of application No. 09/183,528, filed on Oct. 30, 1998, now Pat. No. 6,138,701, which is a continuation-in-part of application No. 09/056,729, filed on Apr. 7, 1998, now Pat. No. 6,032,685, which is a continuation-in-part of application No. 09/004,829, filed on Jan. 9, 1998, now Pat. No. 5,975,101, which is a continuation-in-part of application No. 08/717,408, filed on Sep. 20, 1996, now Pat. No. 5,941,265.

(51) Int. Cl.[7] ............................................. E04H 15/40
(52) U.S. Cl. .................... 135/125; 135/128; 135/130; 135/143; 135/157; 160/377; 446/478; 446/487
(58) Field of Search ................. 135/125, 128, 135/130, 143, 157; 160/377; 446/478, 487

(56) References Cited

U.S. PATENT DOCUMENTS

| | | |
|---|---|---|
| 3,675,667 A | 7/1972 | Miller |
| 3,960,161 A | 6/1976 | Norman |
| 3,990,463 A | 11/1976 | Norman |
| 4,815,784 A | 3/1989 | Zheng |
| 4,825,892 A | 5/1989 | Norman |
| 4,858,634 A | 8/1989 | McLeese |
| 5,038,812 A | 8/1991 | Norman |
| 5,137,044 A | 8/1992 | Brady |
| 5,163,461 A | 11/1992 | Ivanovich et al. |
| 5,249,592 A | 10/1993 | Springer et al. |
| 5,301,705 A | 4/1994 | Zheng |
| 5,337,772 A | 8/1994 | Habchi |
| 5,385,165 A | 1/1995 | Hazinski et al. |
| 5,439,017 A | 8/1995 | Brown |
| 5,439,018 A | 8/1995 | Tsai |
| 5,452,934 A | 9/1995 | Zheng |
| 5,560,385 A | 10/1996 | Zheng |
| 5,592,961 A | 1/1997 | Chin |
| 5,601,105 A | 2/1997 | Blen et al. |
| 5,645,096 A | 7/1997 | Hazinski et al. |
| 5,676,168 A | 10/1997 | Price |
| 5,800,067 A | 9/1998 | Easter |
| 5,816,278 A | 10/1998 | Kim |

FOREIGN PATENT DOCUMENTS

| | | |
|---|---|---|
| DE | 3013178 | 11/1981 |
| FR | 2635136 | 2/1990 |
| FR | 2699459 | 6/1994 |
| WO | WO9416178 | 7/1994 |

OTHER PUBLICATIONS

Frontgate Summer 1995 Catalog Velcro Product Instruction Sheet (3/97).

*Primary Examiner*—Beth A. Stephan
(74) *Attorney, Agent, or Firm*—Raymond Sun

(57) ABSTRACT

Collapsible structures are provided having at least two panels, with each of the panels having a flexible loop member defining a closed loop and adapted to assume an expanded position and a collapsed position, and a fabric for partially covering the loop member. The loop members of two adjacent first and second panels overlap each other at a first overlapping point along first edges of the loop members, and at a second overlapping point along second edges of the loop members, with the overlapping loop members defining a hinge portion about which the two loop members of the first and second panels are pivotable.

23 Claims, 39 Drawing Sheets

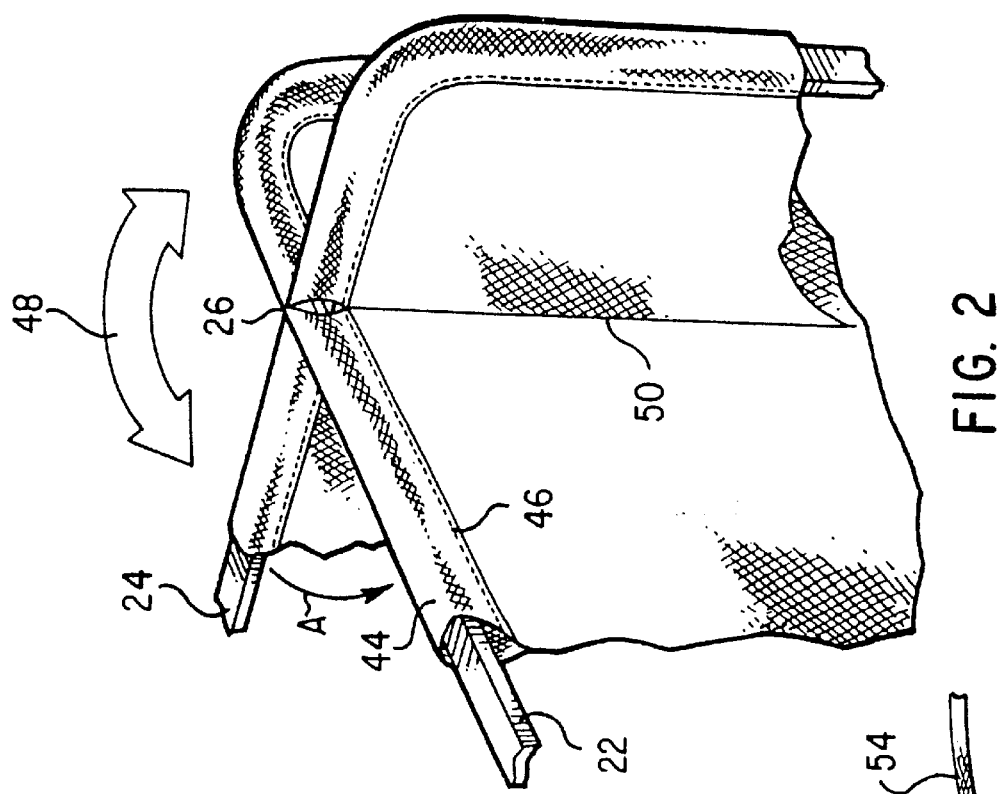
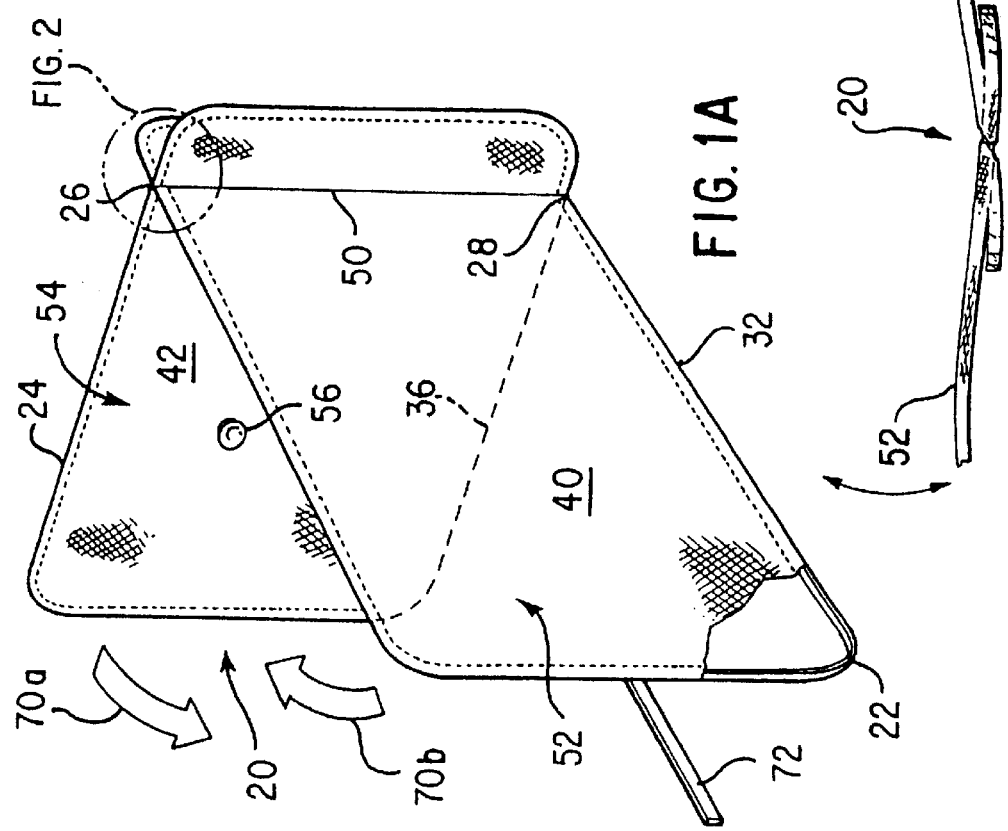

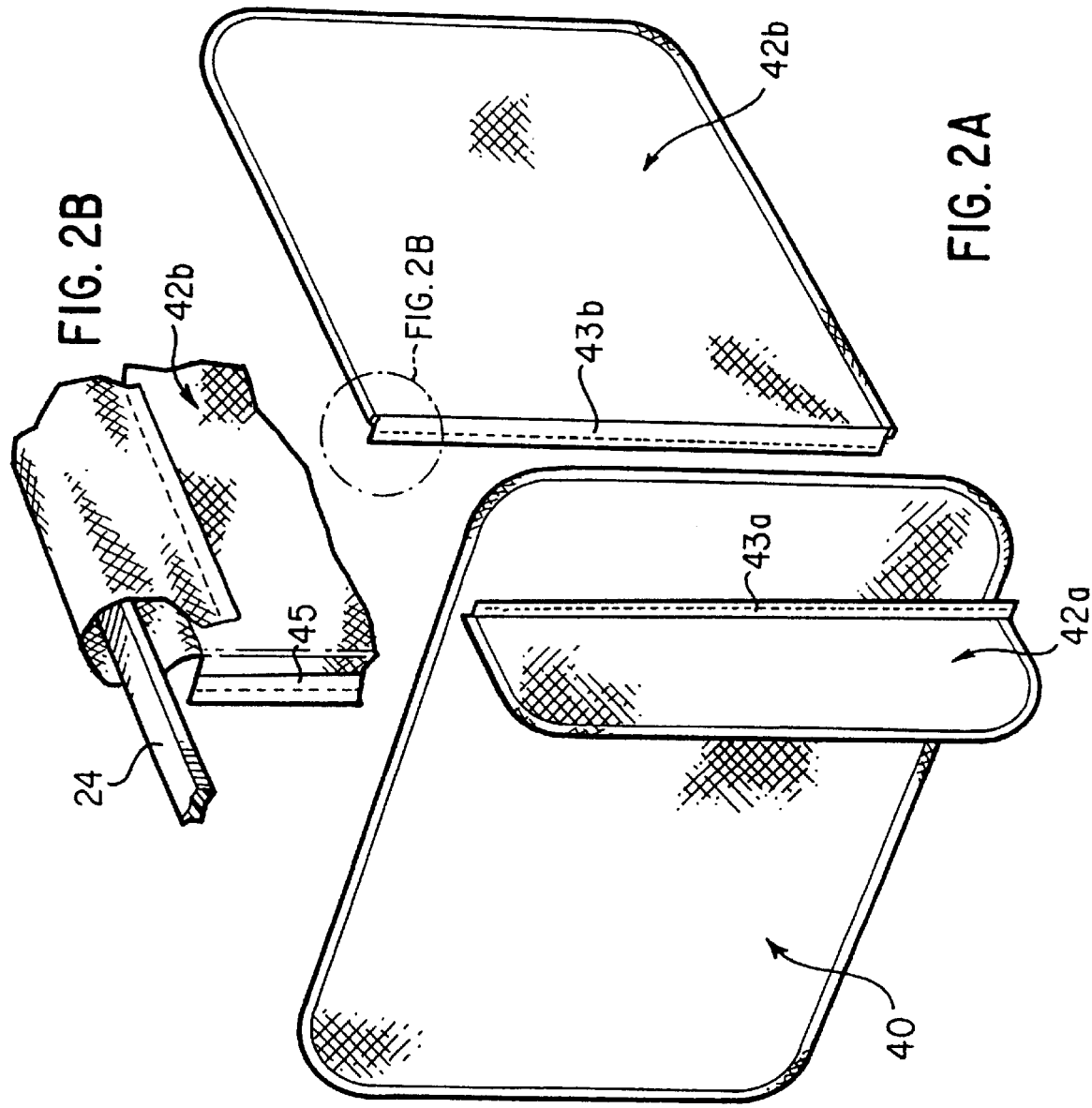

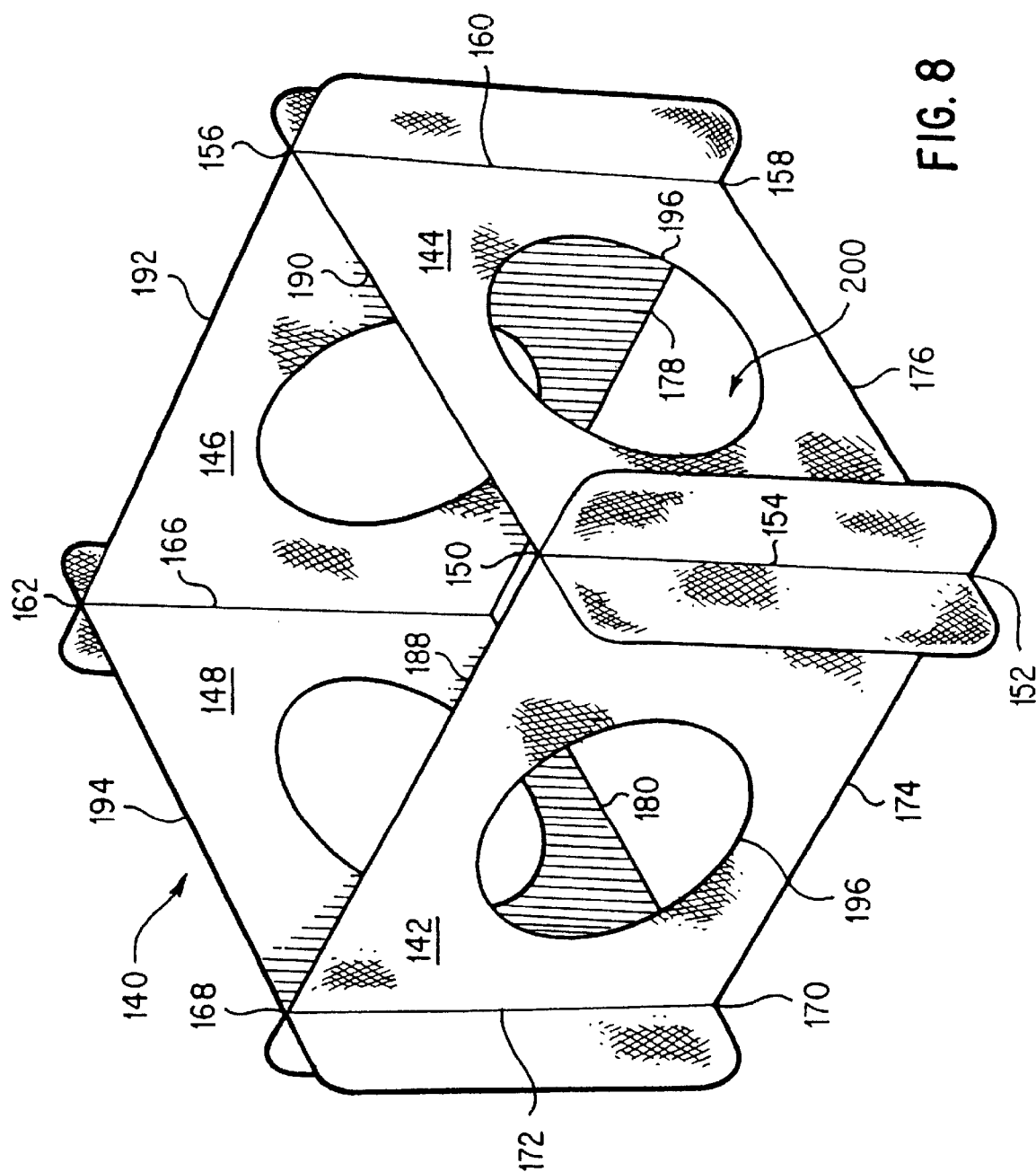

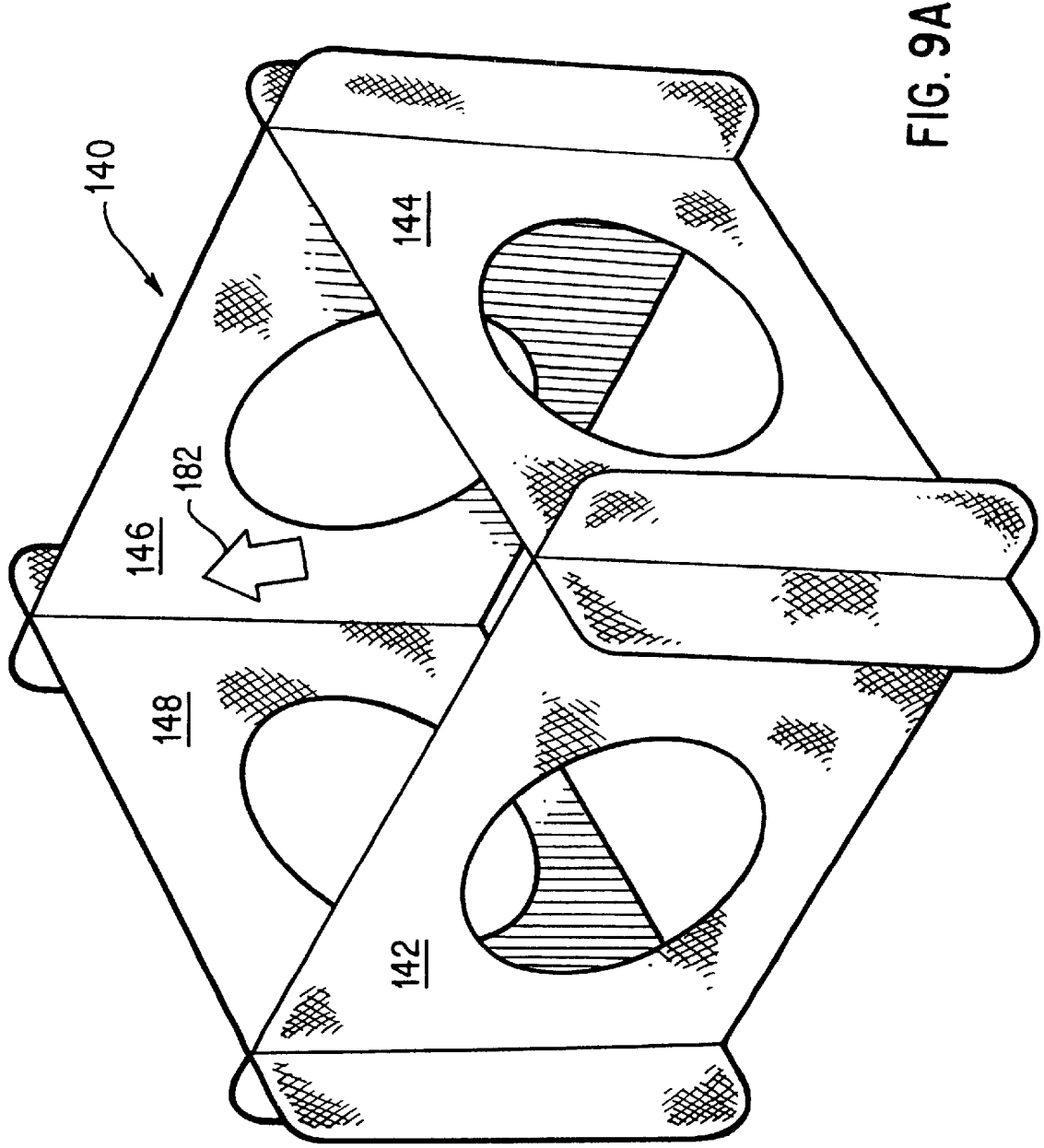

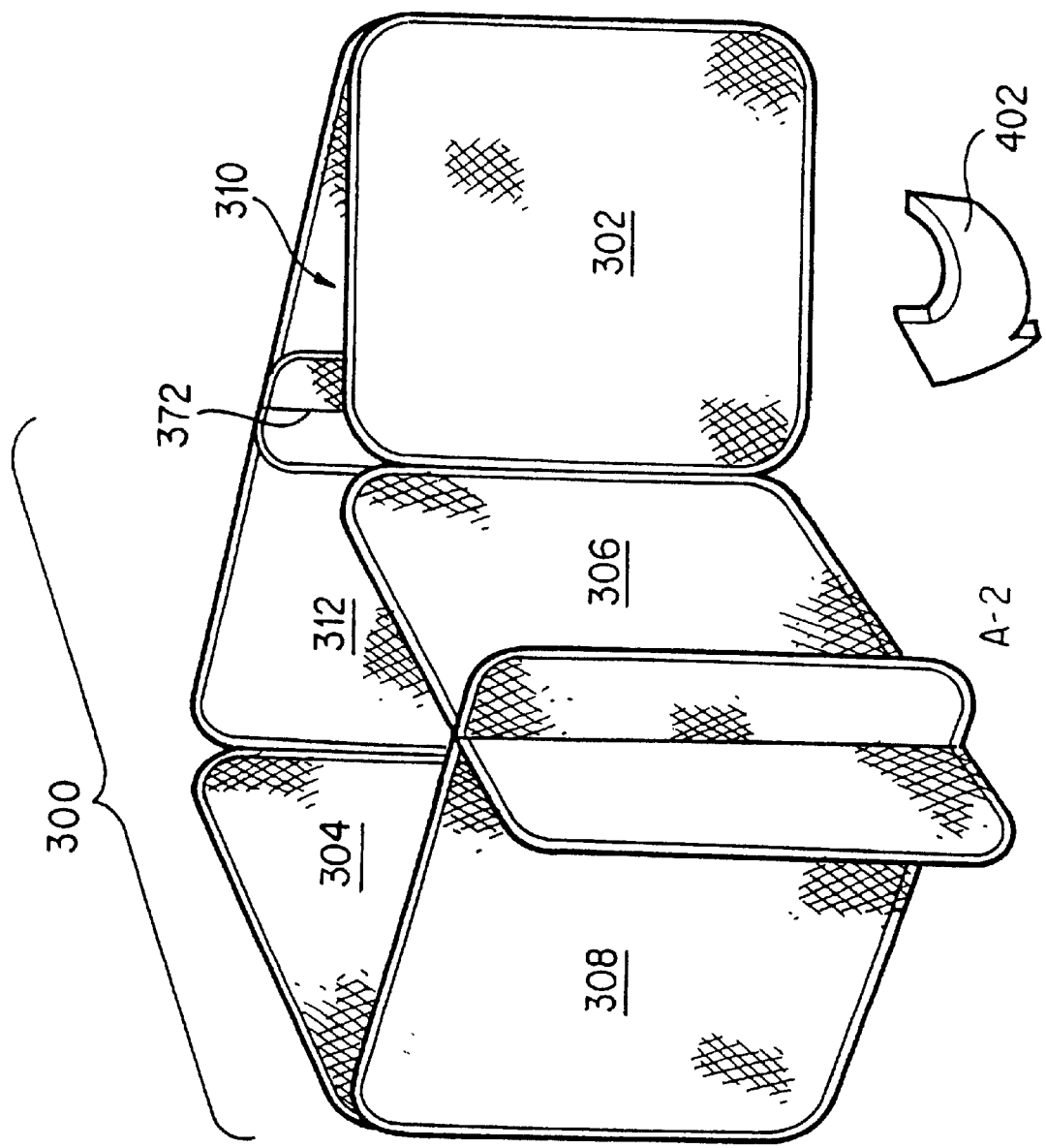

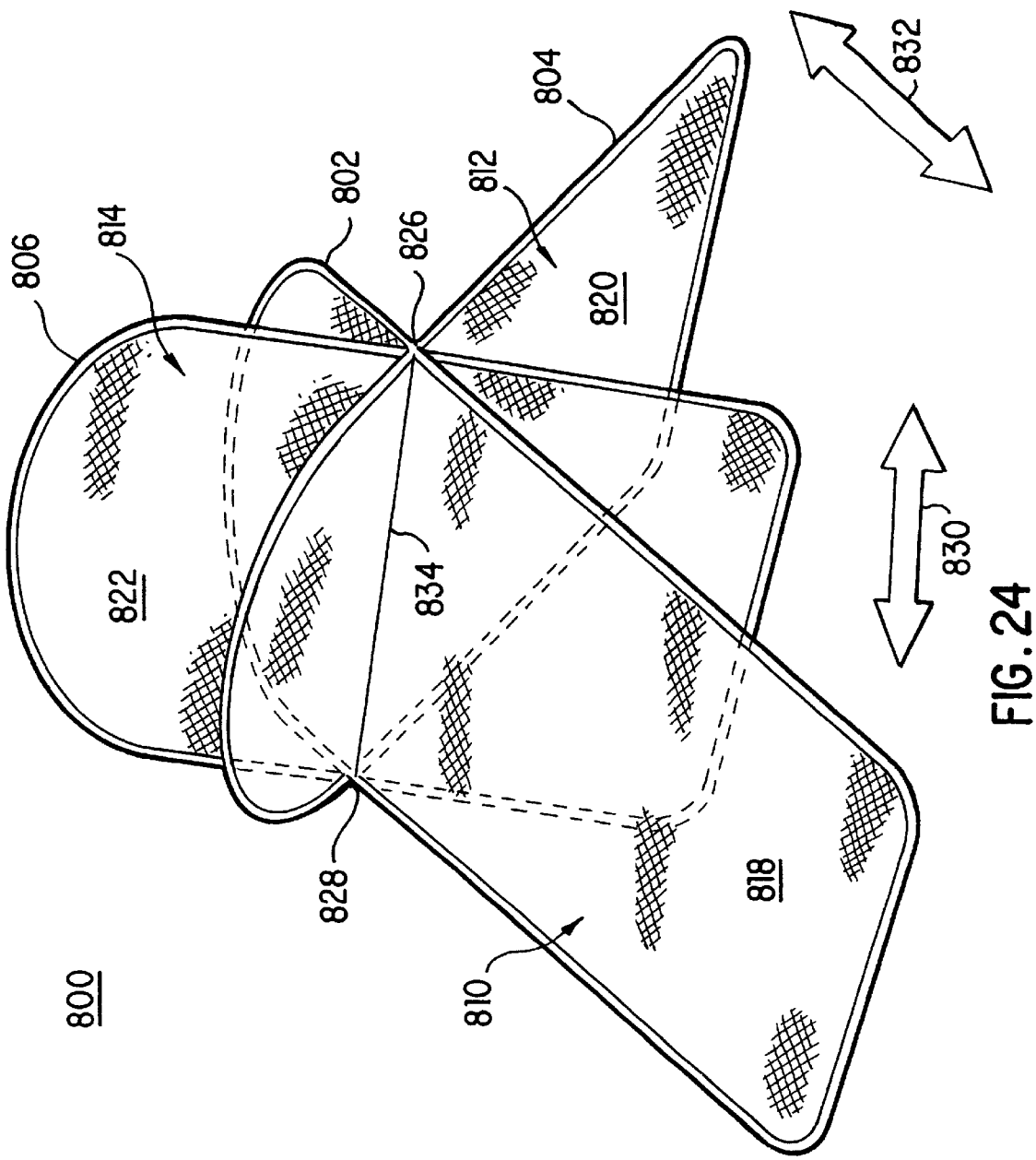

COLLAPSIBLE STRUCTURES HAVING OVERLAPPING SUPPORT LOOPS

RELATED CASES

This is a continuation-in-part of Ser. No. 09/183,528, entitled "Collapsible Structures Having Overlapping Support Loops", filed Oct. 30, 1998 now U.S. Pat. No. 6,138, 701, which is a continuation-in-part of Ser. No. 09/056,729, entitled "Collapsible Structures Having Overlapping Support Loops", filed Apr. 7, 1998 now U.S. Pat. No. 6,032,685, which is a continuation-in-part of Ser. No. 09/004,829, entitled "Collapsible Structures Having Overlapping Support Loops", filed Jan. 9, 1995 now U.S. Pat. No. 5,975,101, which is in turn a continuation-in-part of Ser. No. 08/717, 408, entitled "Collapsible Sunshields, Partitions and Shade Structures Having Overlapping Support Loops", filed Sep. 20, 1996 now U.S. Pat. No. 5,941,265, whose disclosures are incorporated by this reference as though fully set forth herein.

BACKGROUND OF THE INVENTION

1. Field of the Invention

The present invention relates to sunshields, partitions and structures, and in particular, to collapsible sunshields, partitions, shade structures and other structures supported by resilient loop members maintained in overlapping relationship with each other. These sunshields, partitions, and structures may be twisted and folded to reduce the overall size of the sunshield, partition or structure.

2. Background Art

A number of prior art sunshields are well-known for use, for example, in shielding the interior of an automobile from unwanted heat and sunlight. These sunshields may be positioned against an interior window surface, but are typically positioned against the windshield because of the difficulty of retaining these sunshields against the other window surfaces. Examples of these sunshields are illustrated in U.S. Pat. No. 4,815,784 to Zheng, U.S. Pat. No. 5,024,262 to Huang, and U.S. Pat. No. 5,452,934 to Zheng. In each of these sunshields, one or more resilient loop members are used to support the sunshield in an expanded configuration. These sunshields may be twisted and folded to reduce the overall size of the sunshield.

A number of prior art shade or tent structures have also been provided for a wide variety of uses, such as for camping, for shade, or for play by children. Examples of these shade structures are illustrated in U.S. Pat. No. 3,990, 463 to Norman, U.S. Pat. No. 4,825,892 to Norman, U.S. Pat. No. 5,038,812 to Norman, and U.S. Pat. No. 5,467,794 and U.S. Pat. No. 5,560,385 both to the present inventor. Each of these shade structures also use one or more resilient loop members to support the structure in an expanded configuration. These shade structures may be twisted and folded to reduce the overall size of the shade structure.

In addition to sunshields and shade structures, there are also other structures that are provided for amusement purposes. Examples of such structures are illustrated in the present inventor's U.S. Pat. No. 5,722,446. Each of these structures also use one or more resilient loop members to support the structure in an expanded configuration. These structures may also be twisted and folded to reduce the overall size of the structure.

SUMMARY OF THE INVENTION

The present invention provides basic principles which are effective in constructing a wide variety of collapsible structures, such as but not limited to sunshields, partitions, shade structures, amusement structures, container structures and other structures that can be twisted and folded to reduce the overall size of the structure for convenient transportation and storage. These collapsible structures have simple constructions, are easy to use, and provide the user with much variety in use and play. In addition, these collapsible structures allow for the stability and support of the structure and portions thereof to be varied and adjusted to accomodate different shapes and sizes for the structure, and to accomodate use in different applications. It is also possible to combine a plurality of the structures to provide structures having different sizes and configurations, thereby increasing the variety of use and play.

The collapsible structures according to the present invention have at least two panels, each of the panels having a flexible loop member defining a closed loop and adapted to assume an expanded position and a collapsed position, and a fabric for partially covering the loop member. The loop members of two adjacent first and second panels overlap each other at a first overlapping point along first edges of the loop members, and at a second overlapping point along second edges of the loop members, with the overlapping loop members defining a hinge portion about which the two loop members of the first and second panels are pivotable.

The panels are foldable on top of each other about their respective hinge portions to have the loop members overlaying each other, and the overlaying loop members are then collapsible to the collapsed positions by twisting and folding to form a plurality of concentric rings to substantially reduce the size of the structure in the collapsed position.

In some embodiments of the present invention, the bottom edges of the panels are adapted to contact a support surface.

BRIEF DESCRIPTION OF THE DRAWINGS

FIG. 1A is a perspective view of a sunshield according to an embodiment of the present invention illustrated in an expanded configuration;

FIG. 1B is a top plan view of the sunshield of FIG. 1A;

FIG. 2 is a perspective cut-away sectional view of the sunshield of FIG. 1A taken along section 2—2 thereof;

FIG. 2A is perspective exploded view illustrating one embodiment of how the fabric pieces are deployed in the resilient loop members of FIG. 1A;

FIG. 2B a perspective cut-away sectional view of the loop member and fabric of FIG. 2A taken along section B—B thereof;

FIG. 8 is a perspective view of a structure according to a further embodiment of the present invention illustrated in an expanded configuration;

FIGS. 9A–9C illustrate how the different panels of the structure of FIG. 8 may be folded upon each other prior to twisting and folding for compact storage;

FIGS. 12B–12D illustrate how the different panels of the structure of FIG. 12A may be folded upon each other prior to twisting and folding for compact storage;

FIG. 24 is a perspective view of a structure according to yet another embodiment of the present invention illustrated in an expanded configuration.

BEST MODES FOR CARRYING OUT THE INVENTION

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The principles of the present invention are applicable to sunshields, partition structures and other structures, including shade structures, container structures, and amusement structures, and shall be described herein in connection with such structures. However, it will be appreciated by those skilled in the art that the principles of the present invention are not so limited and can be applied to other structures for many different uses.

Figure 2C:
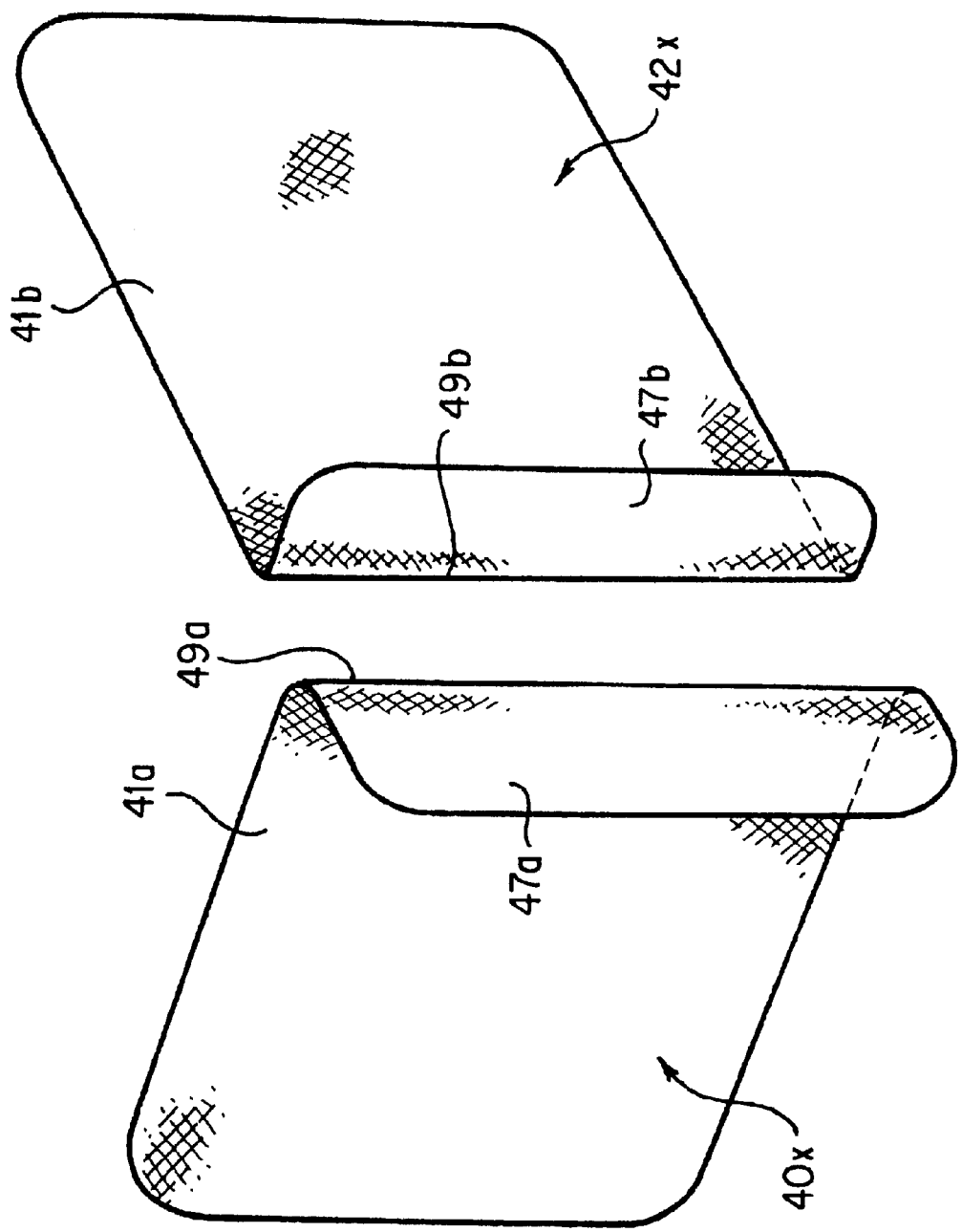
FIG. 2C is perspective exploded view illustrating another embodiment of how the fabric pieces are deployed in the resilient loop members of FIG. 1A.
Figure 3:
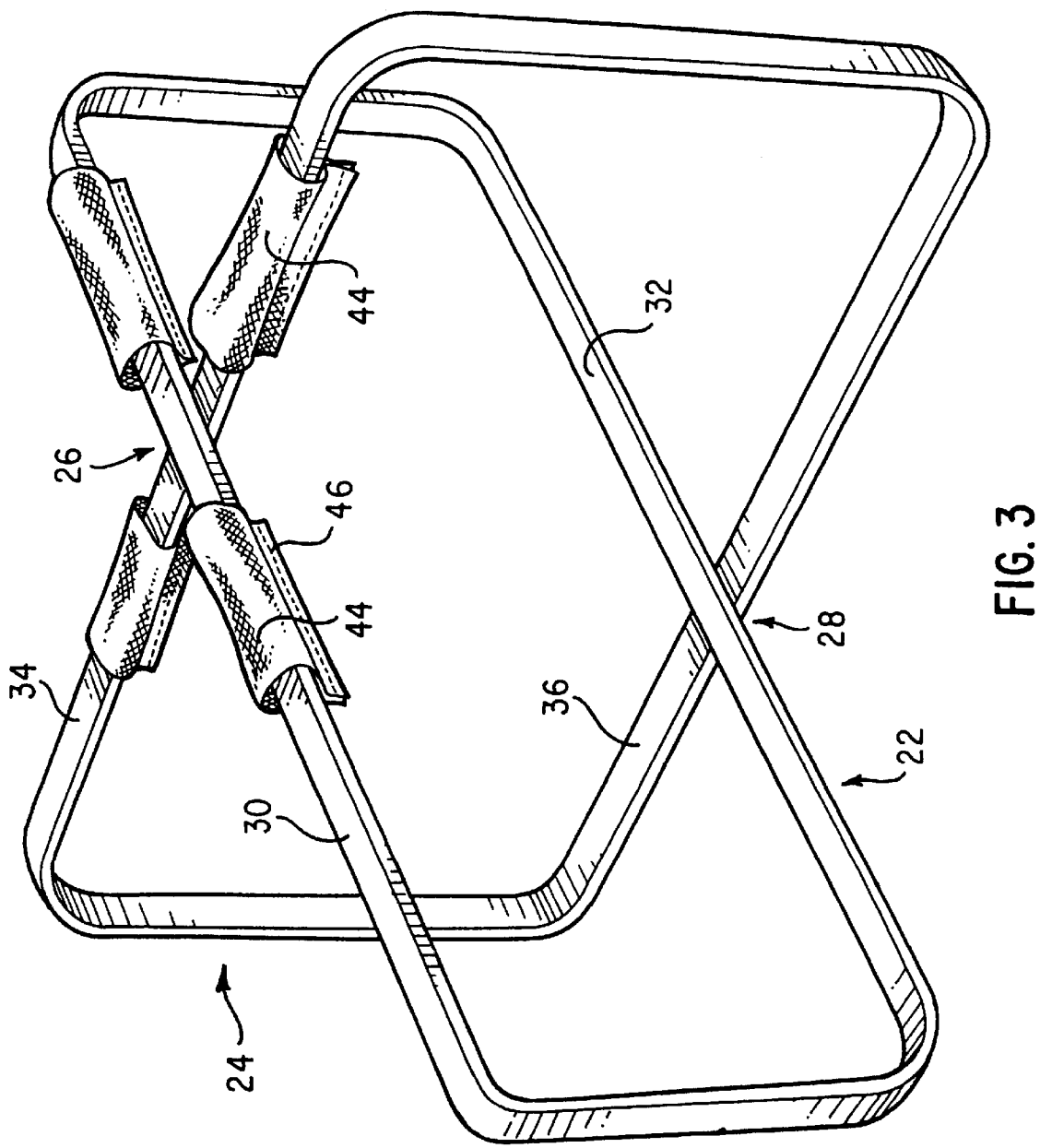
FIG. 3 is a perspective view of the resilient loop members that can be used to support the sunshield of FIG. 1A.

FIGS. 1–3 illustrate a structure 20 according to one embodiment of the present invention, which may be used as a sunshield. The sunshield 20 is formed by two resilient loop members 22 and 24 that together define the outer boundary of the sunshield 20. Referring to FIG. 3, each loop member 22 and 24 is provided as a closed resilient loop, either as a closed continuous loop or as a strip of material with both ends held together by a retaining connector or other conventional attachment mechanism to form a closed loop. The resilient loop members 22 and 24 are preferably made from a relatively strong springy material which is flexible enough to allow it to be coiled. The preferred material for the loop members 22 and 24 includes flat spring steel stock, and in particular, stainless steel, although plastic may also be used. Each closed loop member 22 and 24 is preferably substantially equal in size and symmetrically disposed, but it will be appreciated by those skilled in the art that the resilient loop members 22 and 24 may assume any variety of shapes and sizes, including but not limited to circular or oval. Both resilient loop members 22 and 24 can even be provided in different sizes.

As illustrated in FIGS. 1–3, the two loop members 22 and 24 are fitted within each other, and overlap or cross-over each other at overlapping points 26 and 28. The overlapping point 26 is defined by the intersection or crossing of the upper edges 30 and 34 of loop members 22 and 24, respectively, and the overlapping point 28 is defined by the intersection or crossing of the lower edges 32 and 36 of loop members 22 and 24, respectively. The overlapping points 26 and 28 can be positioned anywhere along the upper edge 30 or lower edge 32 of the loop member 22, and anywhere along the upper edge 34 or lower edge 36 of the loop member 24. FIG. 1A illustrates the overlapping points 26 and 28 provided near the adjacent side edges of the two loop members 22 and 24. The two overlapping loop members 22 and 24 are pivotable about their overlapping points 26 and 28 between two positions, a first completely open position (see FIG. 1B) in which both loop members 22 and 24 lie flat in the same plane and extend to the widest longitudinal length of the sunshield 22, and a second folded position in which the loop members 22 and 24 are folded towards each other (such as in the direction of arrows 70a and 70b in FIG. 1) to overlie each other. The sunshield 20 is normally deployed at the windshield of an automobile when in the first completely open position, and the sunshield 20 is deployed to the second folded position as a first step towards folding and collapsing the sunshield 20 into a smaller size, as described in greater detail hereinbelow.

Each loop member 22 and 24 is retained in a loop retaining portion of one or more fabric pieces. For example, as shown in FIG. 1A, two fabric pieces 40 and 42 are provided, one for each loop member 22 and 24, respectively. Each fabric piece 40 and 42 completely covers, and forms a panel 52 or 54 within, the respective loop member 22 or 24, and is preferably held in tension with the loop member 22 or 24. One side of each fabric 40, 42 may used as the window-facing side of the sunshield.

The fabric pieces 40 and 42 are preferably made from a sheet material which is effective in reflecting and blocking light and heat from entering the interior of the automobile, and may be made from sheet fabric, woven fabric, PVC, metal foil, and even films. A layer of metallized fabric or other reflective material may be added to the window-facing sides of the fabric 40, 42 to further aid in reflecting and blocking light and heat. A less expensive, though less effective, alternative is to choose a white fabric as the reflective surface. In addition, the window-facing sides may be provided with a different color so that the user can easily recognize it.

The loop retaining portions are preferably provided in the form of a sleeve for retaining the loop members 22 and 24. The loop members 22 and 24 may be retained at the loop retaining portions by a number of different methods. In a first preferred method, which is illustrated in FIGS. 1–3, a sleeve 44 may be formed by folding a peripheral edge of the fabric 40 or 42 over the loop member 22 or 24 and then applying a stitching (such as designated by numeral 46), or by providing a separately-formed tubular sleeve that is stitched along the same stitch line 46 to the fabric 40, 42. Under this first method, the loop members 22 and 24 may be left free and unsecured within the sleeves 44. In a second preferred method, the loop members 22 and 24 may be mechanically fastened, glued or fused to the sleeve 44 or the fabric 40, 42. Other conventional methods may be used without departing from the spirit and scope of the present invention.

The loop members 22 and 24 should not be connected or attached at the overlapping points 26 and 28 so as to allow the loop members 22 and 24 to pivot about these points. The structure of the sleeve 44 at the overlapping points 26 and 28 can be provided in one of several ways. In a first alternative illustrated in an exaggerated sense in FIG. 3, a small portion of the sleeves 44 for both loop members 22 and 24 may be interrupted or disconnected adjacent the overlapping points 26 and 28 so as to expose the loop members 22 and 24 at these overlapping points 26 and 28. As a second alternative, the sleeves 44 for both panels 52 and 54 can be connected to each other to form a "+" or cross-shaped sleeve portion at the overlapping points 26 and 28 (see FIG. 2). As a third example, the respective sleeves 44 for both panels 52 and 54 can run uninterrupted throughout the closed loop of the loop members 22 and 24. Thus, the loop members 22 and 24 pivot about the overlapping points 26 and 28 in the two directions illustrated by arrow 48 in FIG. 2, with the overlapping points 26 and 28 together acting as a hinge mechanism when the loop members 22 and 24 are pivoted about these points 26 and 28 at the same time. To better define the overall hinge mechanism created by the overlapping portions 26 and 28, this hinge mechanism may optionally include a stitch line 50 along which the two fabric pieces 40 and 42 are stitched together. The stitch line 50 extends from one overlapping point 26 to the other overlapping point 28, and assists in maintaining the loop members 22 and 24 at about the same overlapping points 26 and 28 even though the loop members 22 and 24 are not connected or attached to each other. Thus, the two side panels 52 and 54 defined by the loop members 22 and 24, respectively, may also be hinged and pivoted about the stitch or pivot line 50.

Referring now to FIG. 2A, the first fabric piece 40 can be provided in the form of a single piece of fabric that spans the space between the loop member 22. The second fabric piece 42 can be provided in the form of two separate portions of fabric, 42a and 42b. Each separate portion 42a, 42b has an inner edge 43a, 43b, respectively, that does not have, or is not attached to, a sleeve 44, but is instead stitched or otherwise attached to the first fabric 40 to form the stitch line 50. This is illustrated in greater detail in FIG. 2B, where a small strip 45 of the inner edge 43b is folded and stitched to the first fabric 40. It should be noted that although FIGS. 2A and 2B appear to show that the loop member 24 has been separated, this is not true since the loop member 24 is illustrated in this manner because of the exploded nature of these illustrations. Only the fabric portions 42a and 42b are separated, and as shown in greater detail in FIG. 2B, the loop member 24 extends over the overlapping points 26 and 28.

FIG. 2C illustrates another technique of attaching the fabric pieces 40, 42 to the loop members 22, 24. In this embodiment, only two fabric pieces 40x, 42x are provided, and each is adapted to span across and cover portions of both loop members 22, 24 (the loop members 22, 24 are not shown in FIG. 2C). Specifically, the first fabric piece 40x has a first portion 41a that covers or spans the majority of the first loop member 22 and is folded along a fold line 49a to form a second portion 47a that covers or spans a small portion of the second loop member 24. Similarly, the second fabric piece 42x has a first portion 41b that covers or spans the majority of the second loop member 24 and is folded along a fold line 49b to form a second portion 47b that covers or spans a small portion of the first loop member 22. The fold lines 49a, 49b can be stitched together to form the stitch line 50.

It will also be appreciated that the loop retaining portion or sleeve 44 can be provided either at the periphery of the fabric 40 and 42, as shown in FIGS. 1–3, or at a portion of the fabric 40 and 42 interior from the periphery. The only requirement is that the loop members 22 and 24 be positioned so that they can sufficiently support the sunshield 20 to effectively cover the automobile window or sunshield.

It will be appreciated that suction cups 56 can be optionally positioned anywhere on the window-facing sides of the fabric 40 and 42. Further, it will be appreciated by those skilled in the art that other conventional attachment devices, such as snaps or VELCRO™, may be used in place of the suction cups 56 without departing from the spirit and scope of the present invention.

Figure 4:
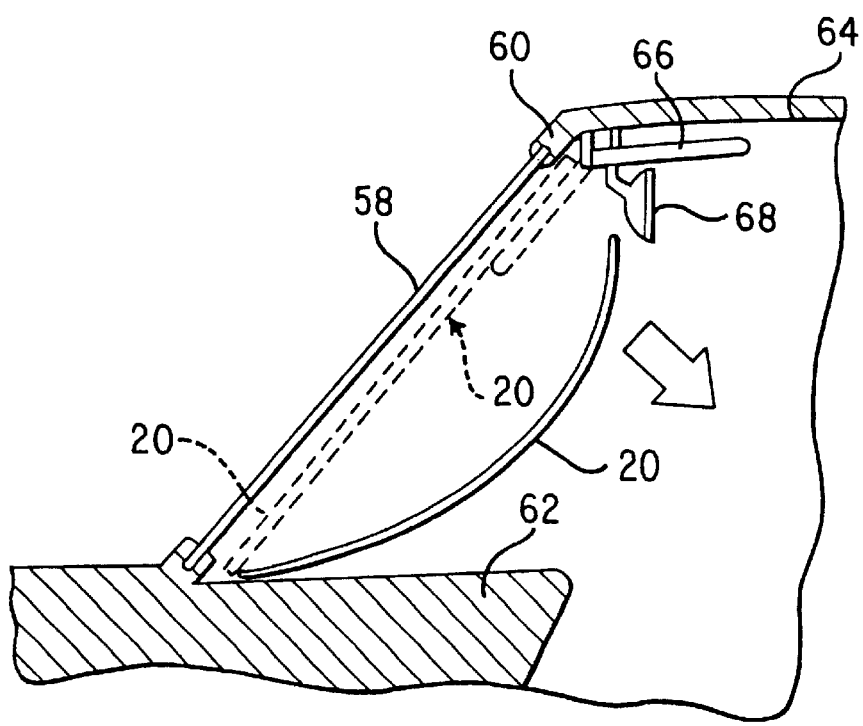
FIG. 4 is a side elevational view of the sunshield of FIG. 1A positioned behind an automobile windshield.

FIG. 4 illustrates the sunshield 20 in position against a windshield 58. Although the operation of the sunshield 20 is shown in connection with a windshield, it is understood that the sunshield 20 can also be used effectively in the same manner with side and rear windows. The windshield 58 is held in position by a frame 60 and the sunshield 20 is positioned between a dashboard 62 and a ceiling 64 of the automobile. Visors 66 and the rear view mirror 68 may be used to provide support for the sunshield 20 against the windshield 58, although it is understood that the visors 66 are not necessary if the suction cups 56 are used. In most cases, suction cups 56 alone are sufficient for retaining the sunshield 20 against the windshield 58 or any side window or rear window where there are no overhanging visors. However, when used to cover a windshield 58, the visors 66 may also be flipped down to assist in retaining the sunshield 20 against the windshield 58. When the sunshield 20 is to be stored, the sunshield 20 can be easily removed from the windshield 58 by pulling the suction cups 56 from the windshield 58. These suction cups 56 can also be removably attached to the fabric pieces 40 and 42 so that worn-out or defective suction cups 56 can be replaced after a period of use.

The shape of the loop members 22 and 24, and of the resulting sunshield 20, is not important as long as they are sized and shaped so that they sufficiently support the sunshield 20 to effectively cover the entire windshield 58. Any shape may be used, and a few examples are illustrated in my previous U.S. Pat. No. 4,815,784 to Zheng, the entire disclosure of which is incorporated by this reference as though fully set forth herein. For example, the loop members 22 and 24 may be circular, oval, truncated circular, truncated oval, substantially rectangular, or any other variety of shapes.

Figure 5A:
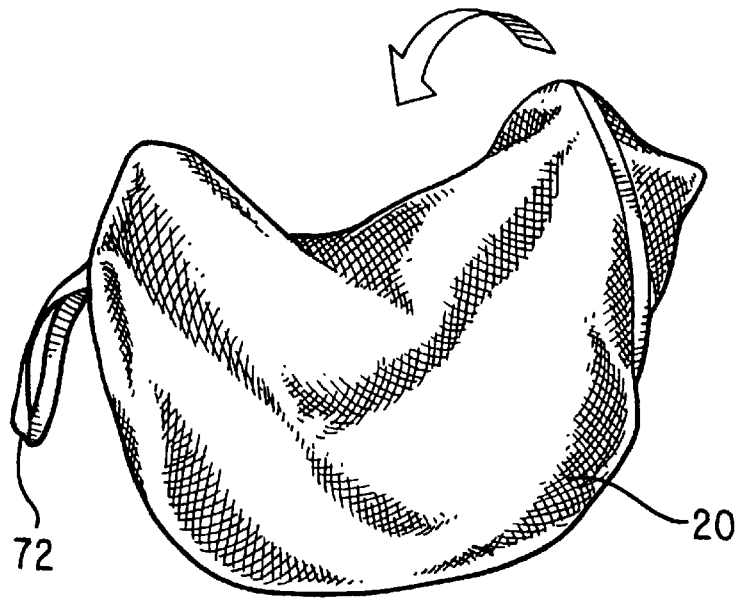
FIGS. 5A through 5E illustrate how the sunshield of FIG. 1A may be twisted and folded for compact storage.
Figure 5B:
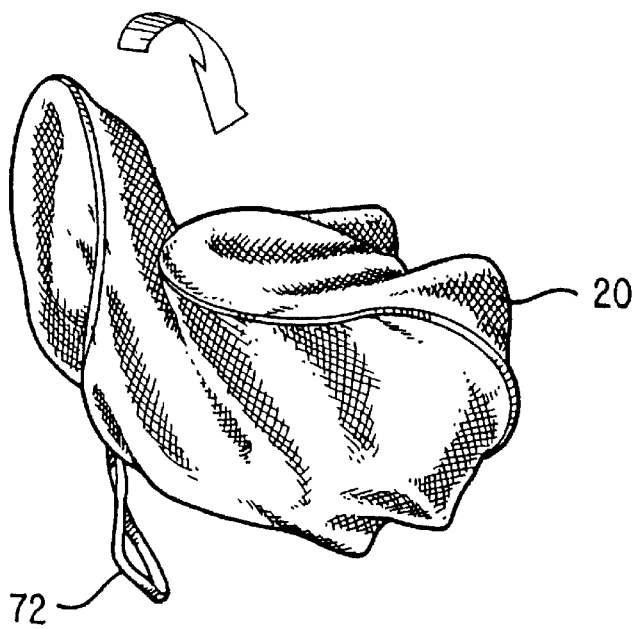
Figure 5C:
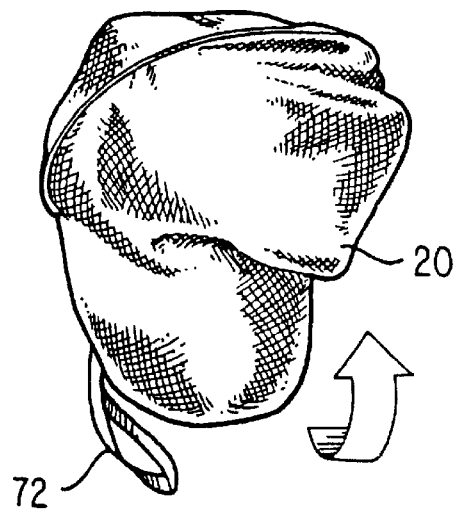
Figure 5D:

FIGS. 5(A) through 5(E) describe the various steps for folding and collapsing the structure 20 of FIG. 1 for storage. The first step consists of folding the two loop members 22 and 24 toward each other (as shown by arrows 70a and 70b in FIG. 1) about the hinge mechanism of the overlapping points 26 and 28, and the optional stitch line 50. When the two loop members 22 and 24 are folded together, the second step, shown in FIG. 5A, is to twist and fold the combined structure to initially collapse the loop members and fabric into a smaller diameter. As shown in FIG. 5B, the third step is to fold in the opposite side of the combined structure upon the previous fold to further collapse the combined loop members. As shown in FIG. 5C, the fourth step is to continue the collapsing so that the size of the structure is a fraction of the diameter of the initial structure. FIG. 5D shows the fifth step with the loop members 22, 24 and fabric panels 52, 54 collapsed on each other to provide for a small essentially compact configuration having a plurality of concentric closed loop rings and layers of fabric so that the collapsed structure has a size which is a fraction of the original size of the structure.

Figure 5E:
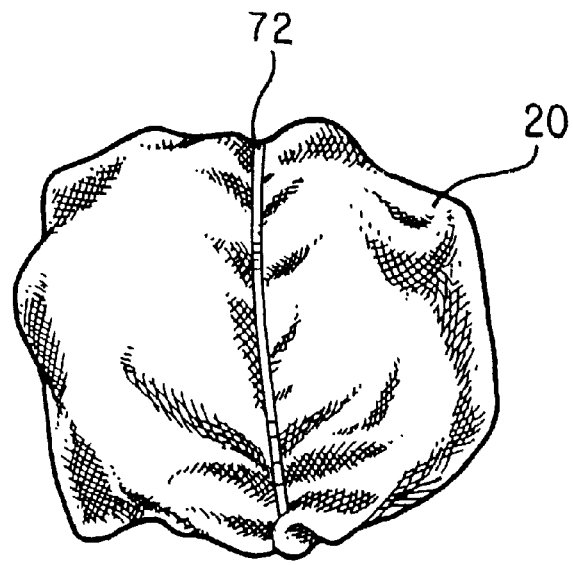

In addition, referring to FIGS. 1 and 5E, a retaining member 72 may be attached to one end of the sunshield 20, and may be used to tie or hold the collapsed sunshield 20 in the collapsed position. Alternatively, a bag (not shown) may be used to store the collapsed sunshield 20.

Figure 5F:
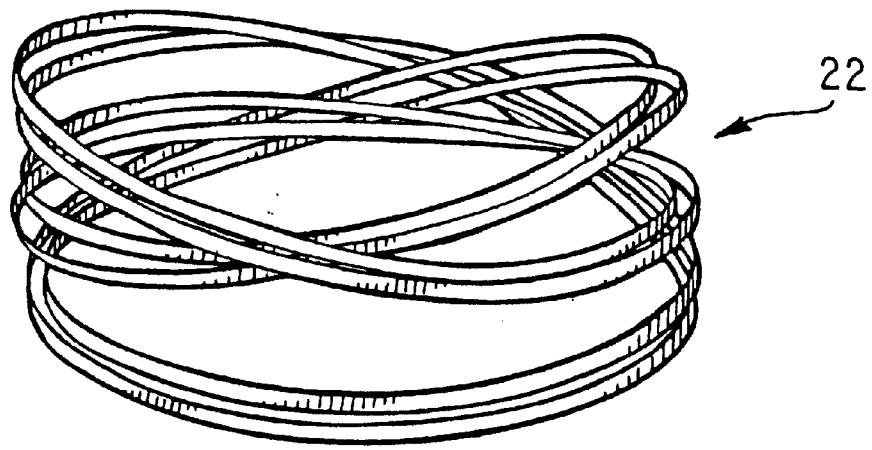
FIG. 5F illustrates the resilient loop members of FIG. 3 in a folded position illustrating how the loop members are folded to provide for two sets of three loop portions to thereby substantially reduce the size thereof.

FIG. 5F illustrates loop members 22 and 24 in the collapsed position. The structure of each loop member 22 and 24 essentially consists of two sets of three loop rings intertwined to lie flat. In the collapsed position, the structure would have a diameter of less than twelve inches, which makes it easy to store the sunshield inside an automobile.

Although the structure 20 is illustrated as being a sunshield 20, the same structure can be provided in larger sizes and used as a partition or for other uses. For example, the structure 20, as shown in FIG. 1 with the lower edges 32 and 36 of the loop members 22 and 24, respectively, resting on a flat surface, such as the ground, can be used as a partition. The panels 52 and 54 would act as the walls of the partition, with the interconnecting hinge mechanism acting as a pivotable corner of the partition. This interconnecting hinge mechanism would be disposed substantially vertically, or perpendicular to the ground. When used as a partition, the size and configuration of the loop members 22 and 24, and therefore the panels 52 and 54, respectively, are not limited to the size and shape of a windshield and can therefore be varied. In addition, the overlapping points 26 and 28 can be positioned along different parts of the upper and lower edges 30, 32, 34 and 36 of the loop members 22 and 24. These variations and modifications can be made to suit the user's needs. As a non-limiting example, a substantially "+" or cross-shaped partition can be defined by positioning the overlapping points 26 and 28 at substantially the centers of the upper and lower edges 30, 32, 34 and 36 of the loop members 22 and 24, or at points between the center and the side edges of the upper and lower edges 30, 32, 34 and 36, as shown in FIG. 3. This will provide a partition which defines four separate non-enclosed spaces. In addition, the angle A (see FIG. 2) between the panels 52 and 54 can be varied between 1 degree and 180 degrees to vary the configuration of the partition and the size of the space defined between the panels 52 and 54. Other alternatives can be provided and modifications made without departing from the spirit and scope of the present invention.

Partitions and sunshields having more than two loop members and panels can also be provided according to the present invention. Referring to another embodiment of the present invention illustrated in FIG. 6, a partition or sunshield 100 has three separate panels 102, 104 and 106, each defined by a loop member (not shown) and having the same construction as panels 52 and 54 and loop members 22 and 24 described above. Panels 102 and 104 are interconnected at the overlapping points 108, 110 and stitch line 112 by overlapping their respective loop members in the manner described above. Similarly, panels 104 and 106 are interconnected at the overlapping points 114, 116 and stitch line 118 by overlapping their respective loop members, also in the manner described above.

Figure 6:
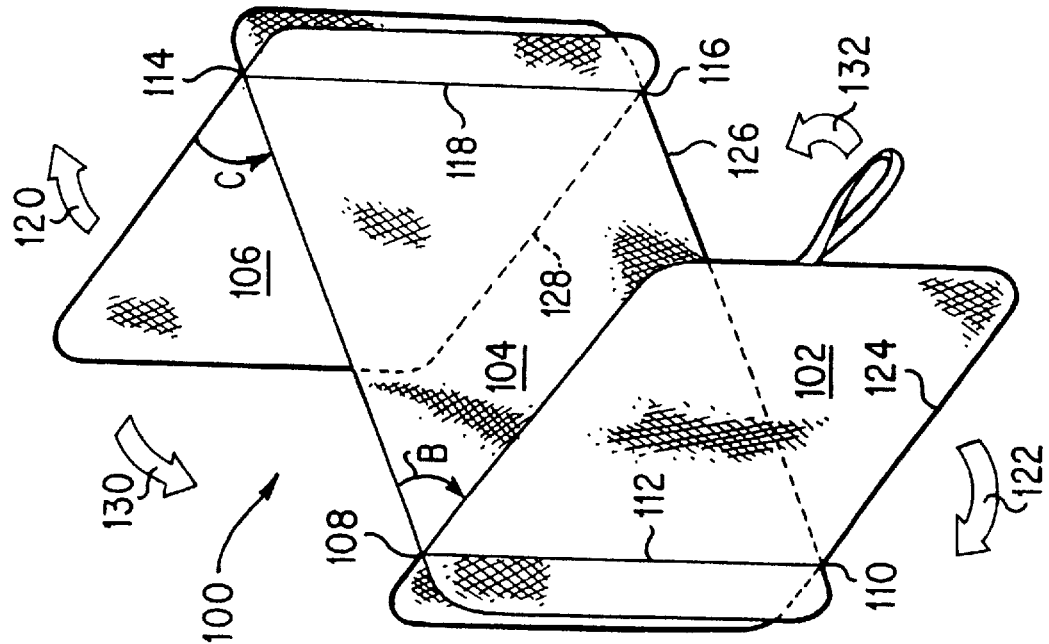
FIG. 6 is a perspective view of a structure according to another embodiment of the present invention illustrated in an expanded configuration.

FIG. 6 shows the structure 100 in use as a partition, with the lower edges 124, 126 and 128 of the panels 102, 104 and 106, respectively, resting on the ground, and the interconnecting hinge mechanisms (i.e., the optional stitch line 112 and the overlapping points 108 and 110, and the optional stitch line 118 and the overlapping points 114 and 116) disposed vertically. The angle B between the panels 102 and 104, and the angle C between the panels 104 and 106, can be varied by pivoting the interconnecting hinge mechanisms. When the structure 100 is to be used as a sunshield, the panels 106 and 102 are folded in the directions indicated by arrows 120 and 122, respectively, so that the three panels 102, 104 and 106 lie flat in the same plane. To fold and collapse the three panels 102, 104 and 106, the panels 106 and 102 are folded toward the panel 104 in the directions indicated by arrows 130 and 132, respectively, so that the three panels 102, 104 and 106 overlie each other to form one stack of panels. The folding and collapsing steps illustrated in FIGS. 5A–5E can be used to fold and collapse the structure 100 into a size which is a fraction of the original size of the structure.

Figure 7:
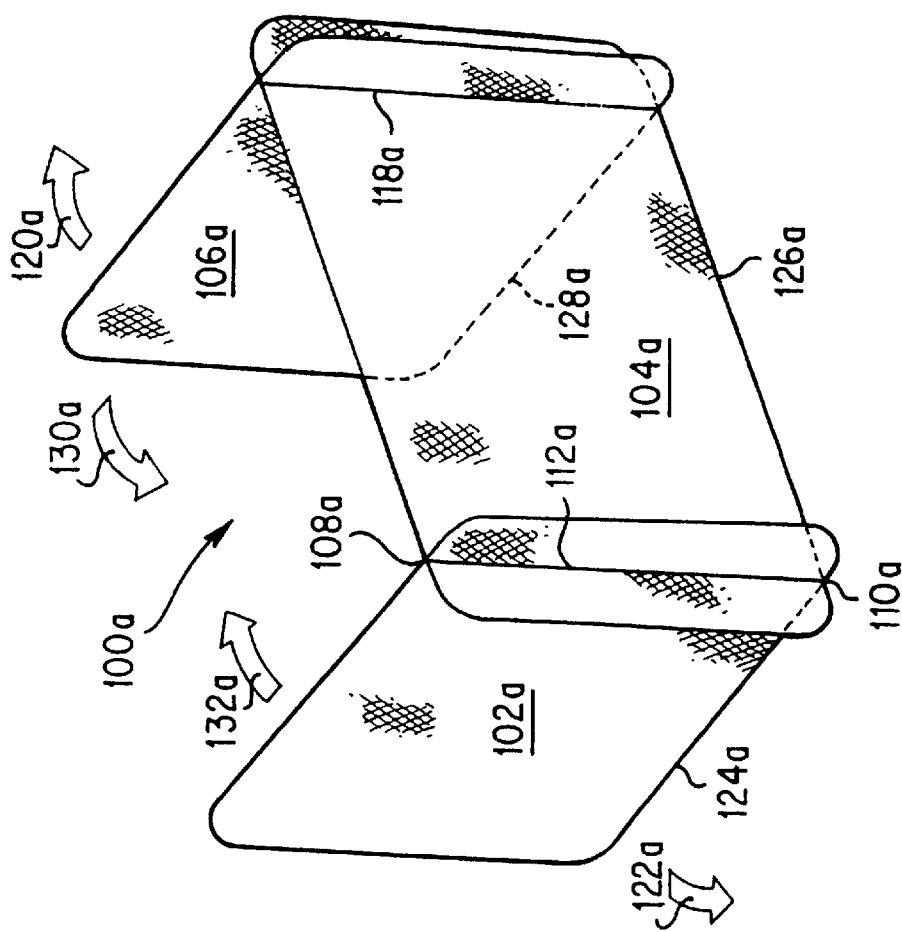
FIG. 7 is a perspective view of a structure according to yet another embodiment of the present invention illustrated in an expanded configuration.

FIG. 7 is a modification 100a of the partition or sunshield 100 of FIG. 6. The structure 100a is essentially the same as the structure 100, except that the panels 102a and 104a are interconnected at overlapping points 108a, 110a and stitch line 112a which are at a different position along the edge 124a of panel 102a. FIG. 7 shows the structure 100a in use as a partition, with the lower edges 124a, 126a and 128a of the panels 102a, 104a and 106a, respectively, resting on the ground, and the interconnecting hinge mechanisms disposed vertically. When the structure 100a is to be used as a sunshield, the panels 106a and 102a are folded in the directions indicated by arrows 120a and 122a, respectively, so that the three panels 102a, 104a and 106a lie flat in the same plane. To fold and collapse the three panels 102a, 104a and 106a, the panels 106a and 102a are folded toward the panel 104a in the directions indicated by arrows 130a and 132a, respectively, so that the three panels 102a, 104a and 106a overlie each other to form one stack of panels. The folding and collapsing steps illustrated in FIGS. 5A–5E can be used to fold and collapse the structure 100a into a size which is a fraction of the original size of the structure.

It is noted that the structures 20, 100 and 100a in FIGS. 1, 6 and 7, respectively, can be used as mats or panels that are laid flat on the ground. For example, the loops 22, 24 and their respective fabrics 40, 42 of the structure 20 can be opened until both the loops 22, 24 are generally parallel to each other, and then placed flat on a surface to operate as a mat, carpet, or similar object. As another example, one loop 22 and its fabric 40 can be placed flat on the ground and the other loop 24 and its fabric 42 supported at an angle to operate as an inclined back rest. These same principles can be applied to the structures 100, 100a.

FIG. 8 illustrates another embodiment in which a structure 140 has four separate panels 142, 144, 146 and 148, each defined by a loop member (not shown) and having the same construction as panels 52 and 54 and loop members 22 and 24 described above. Panels 142 and 144 are interconnected at the overlapping points 150, 152 and stitch line 154 by overlapping their respective loop members in the manner described above. Similarly, panels 144 and 146 are interconnected at the overlapping points 156, 158 and stitch line 160, panels 146 and 148 are interconnected at the overlapping point 162 and stitch line 166, and panels 142 and 148 are interconnected at the overlapping points 168, 170 and stitch line 172. FIG. 8 shows the structure 140 in use as a partition, with the lower edges 174, 176, 178 and 180 of the panels 142, 144, 146 and 148, respectively, resting on the ground, and the four interconnecting hinge mechanisms disposed vertically. The angles between adjacent panels of the partition 140 can be varied by pivoting the interconnecting hinge mechanisms. Openings 196 can be provided in one or more of the panels 142, 144, 146, 148 to provide ingress and egress.

Figure 9B:
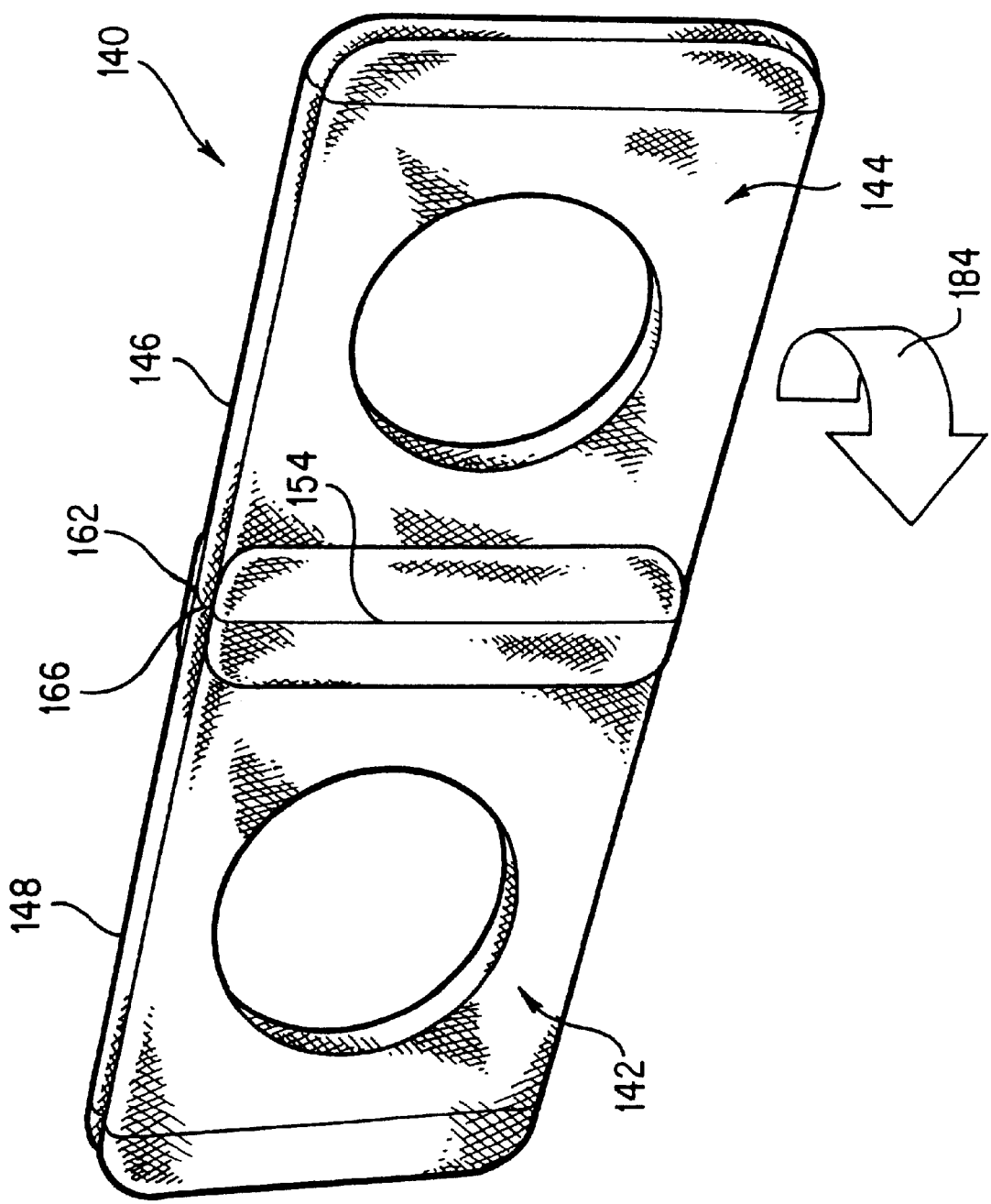
Figure 9C:
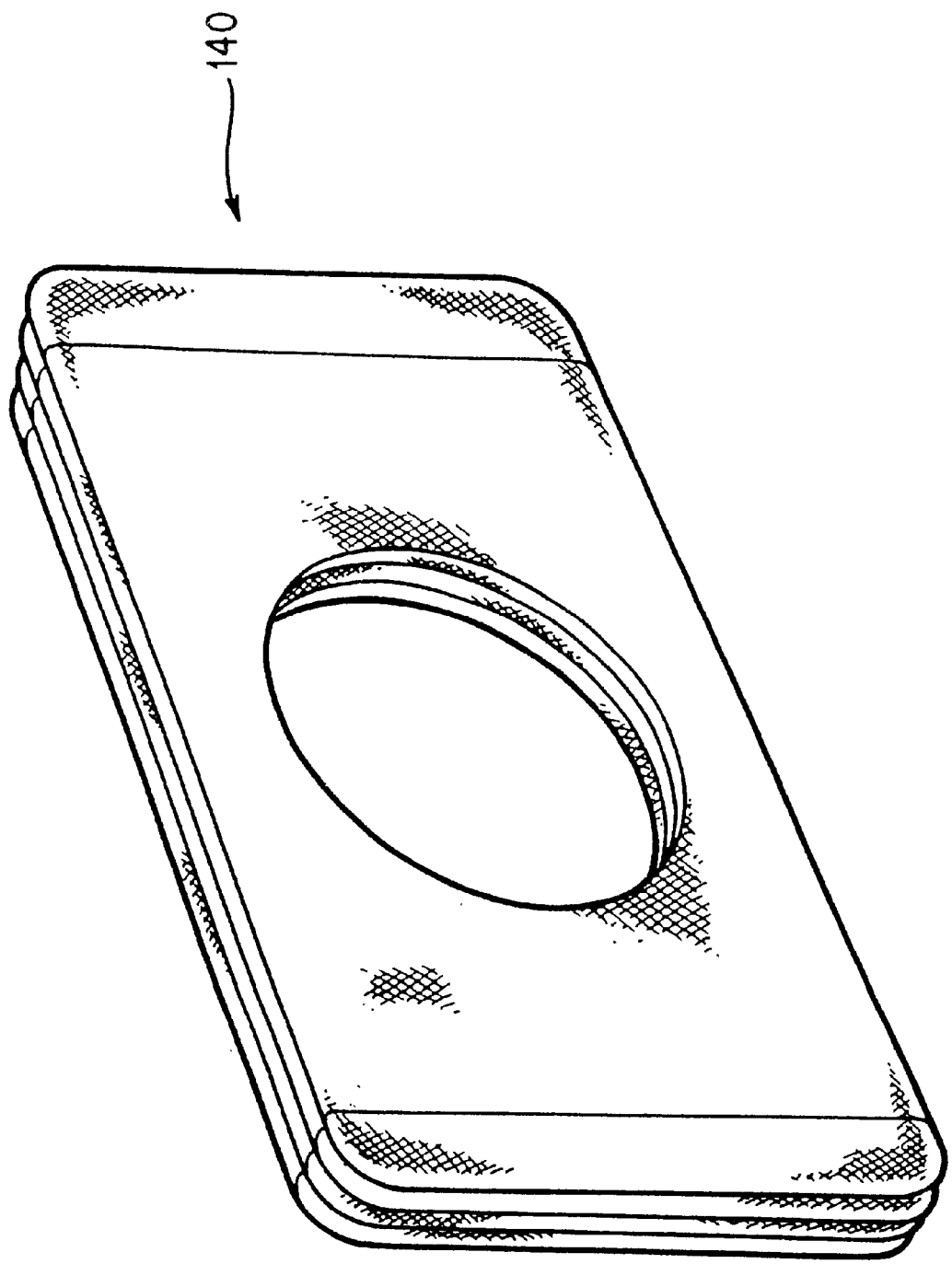

To fold and collapse the four panels 142, 144, 146 and 148, panels 142 and 144 are pushed against panels 148 and 146, respectively, in the direction of arrow 182 shown in FIG. 9A so that the four panels 142, 144, 146 and 148 take the configuration shown in FIG. 9B, with panels 142 and 148 overlying each other and panels 144 and 146 overlying each other. During this first pushing step, the respective interconnecting hinge mechanisms (which include the optional hinge stitches 154, 160, 166 and 172 and their respective overlapping points) are pivoted. One pair of overlaying panels 142, 148 or 144, 146 is then folded over the interconnecting hinge mechanisms defined in part by hinge stitches 154 and 166 in the direction of arrow 184 in FIG. 9B, so that the four panels 142, 144, 146 and 148 overlie each other to form one stack of panels as shown in FIG. 9C. The folding and collapsing steps illustrated in FIGS. 5A–5E can be used to fold and collapse the structure 140 into a size which is a fraction of the original size of the structure.

Figure 11:
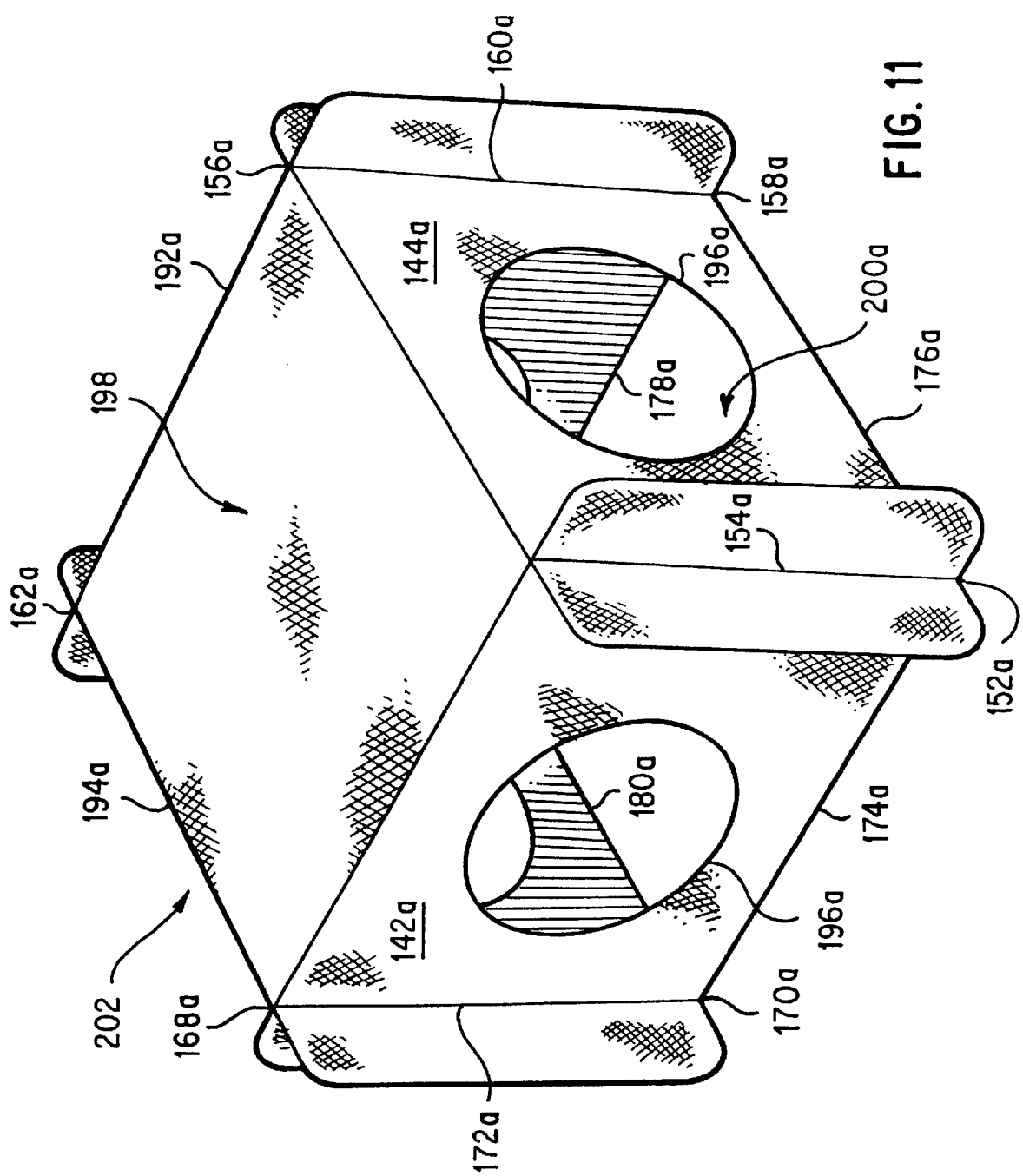
FIG. 11 is a perspective view of a structure according to another embodiment of the present invention illustrated in an expanded configuration, which represents a modification to the structure of FIG. 8.

The partition 140 can also be provided with a roof 198 (shown in FIG. 11) so that it can be used as a collapsible shade structure or tent 202. For example, a fabric panel can be stitched or otherwise connected by known methods to the upper edges 188a, 190a, 192a and 194a of the panels 142a, 144a, 146a and 148a, respectively, so that the four panels 142a, 144a, 146a and 148a and the fabric roof 198 define an enclosed interior space. Openings 196a can be provided in one or more of the panels 142a, 144a, 146a and 148a to provide ingress and egress. In addition, another fabric or other material can be stitched or otherwise connected by known methods to the lower edges 174a, 176a, 178a and 180a of the panels 142a, 144a, 146a and 148a, respectively, to define a floor 200a for the shade structure. The shade structure 202 is folded and collapsed in the same manner described above for partition 140. Even though the structures 140 and 202 are shown as having four panels, it is possible to provide the structures 140 or 202 (used as a partition, shade structure, or other use) with three panels interconnected to each other according to the principles of the present invention.

Figure 11A:
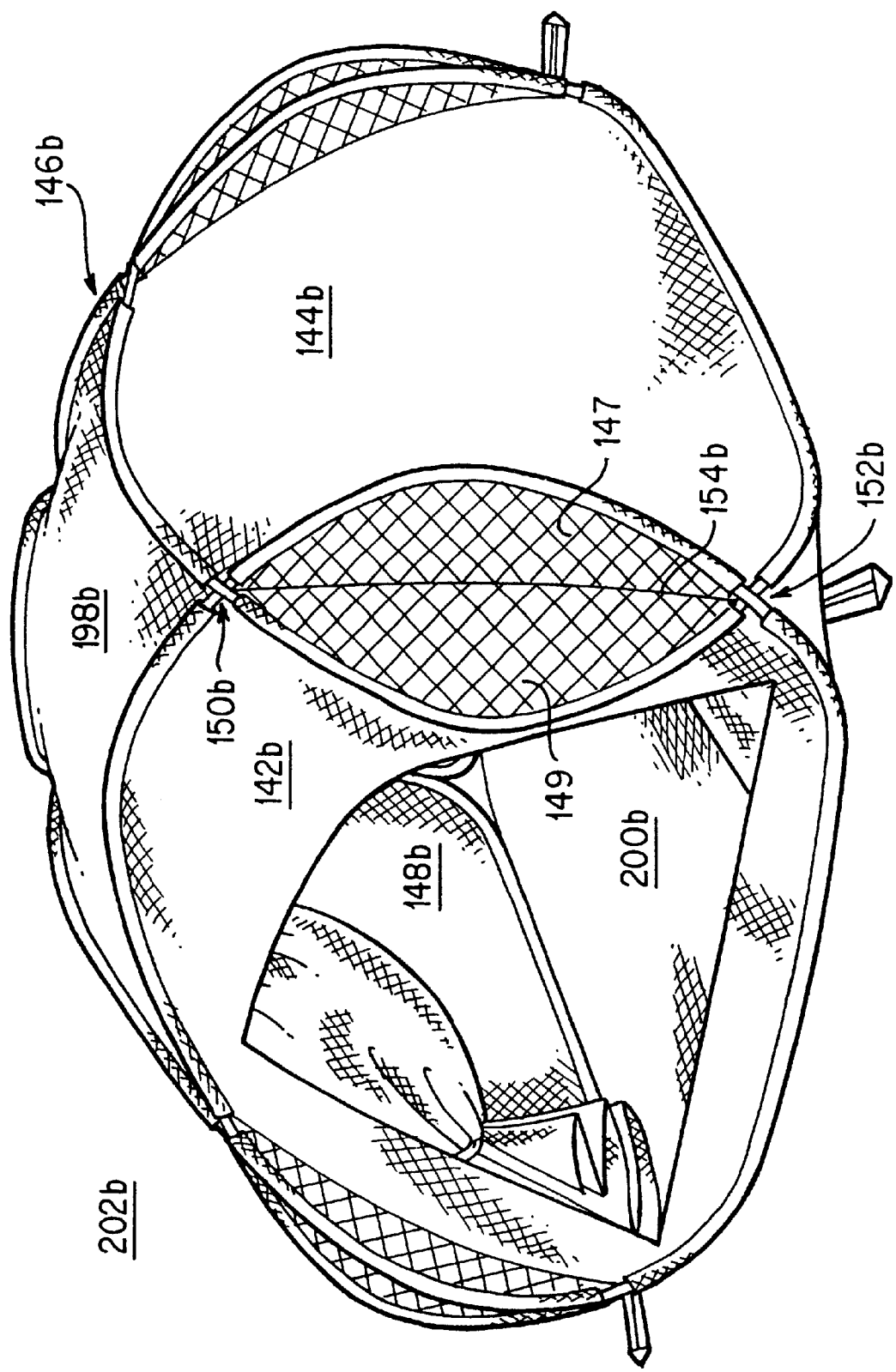
FIG. 11A is a perspective view of a structure according to another embodiment of the present invention illustrated in an expanded configuration, which represents a modification to the structure of FIG. 11.

FIGS. 11A–11D illustrate additional modifications and benefits of the structures according to the present invention. FIG. 11A illustrates a structure 202b that is similar to the structure 202 of FIG. 11, except that the panels 142a, 144a, 146a and 148a are shaped differently from panels 142b, 144b, 146b and 148b in FIG. 11A. The elements of the structure 202 that are the same as the elements of the structure 202b are provided with the same numeral designations except that a "b" has been added to the numeral designations in FIGS. 11A–11D. Each of the panels 142b, 144b, 146b and 148b has a curved outer configuration and overlap adjacent panels at opposing ends. The curved nature of the sides of these panels 142b, 144b, 146b and 148b allows the overlapping points (such as 150b and 152b shown in FIGS. 11B and 11C) to be configured slightly differently from the overlapping configurations illustrated hereinabove.

Figure 11B:
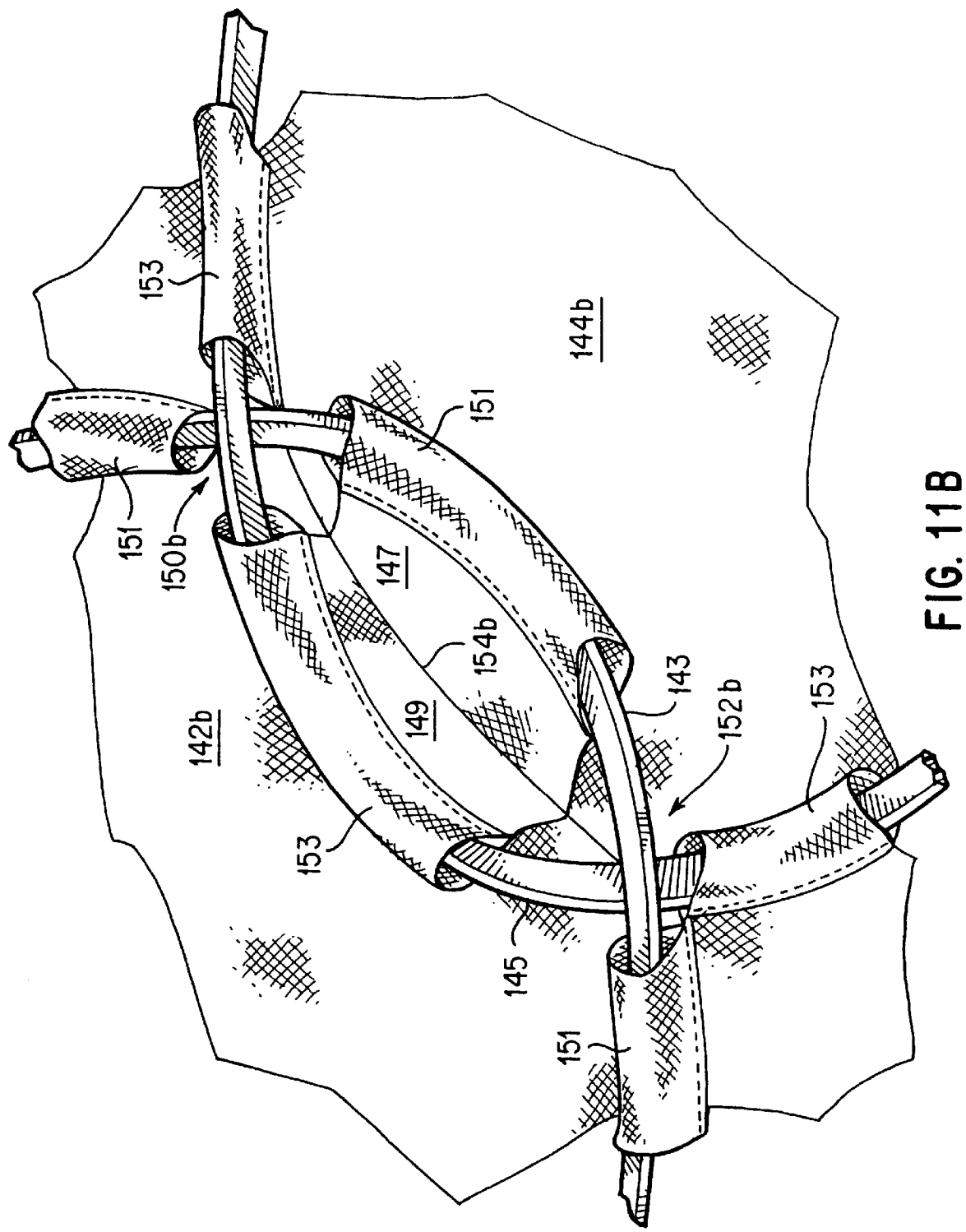
FIG. 11B illustrates the section of the structure of FIG. 11A at the overlapping points and the stitch line.

FIG. 11B illustrates the section of structure 202b at the overlapping points 150b, 152b and the stitch line 154b. Loop member 143 is the loop member that supports panel 142b, and loop member 145 is the loop member that supports panel 144b. The curved nature of the sides of these panels 142b, 144b, 146b and 148b also allows the overlapping loop members (such as 143 and 145) to cross or overlap each other more naturally at the overlapping points (such as 150b and 152b). Fabric portions 147 and 149 for panels 142b and 144b, respectively, are still defined between the sides of the panels 142b, 144b and the stitch line 154b.

Figure 11C:
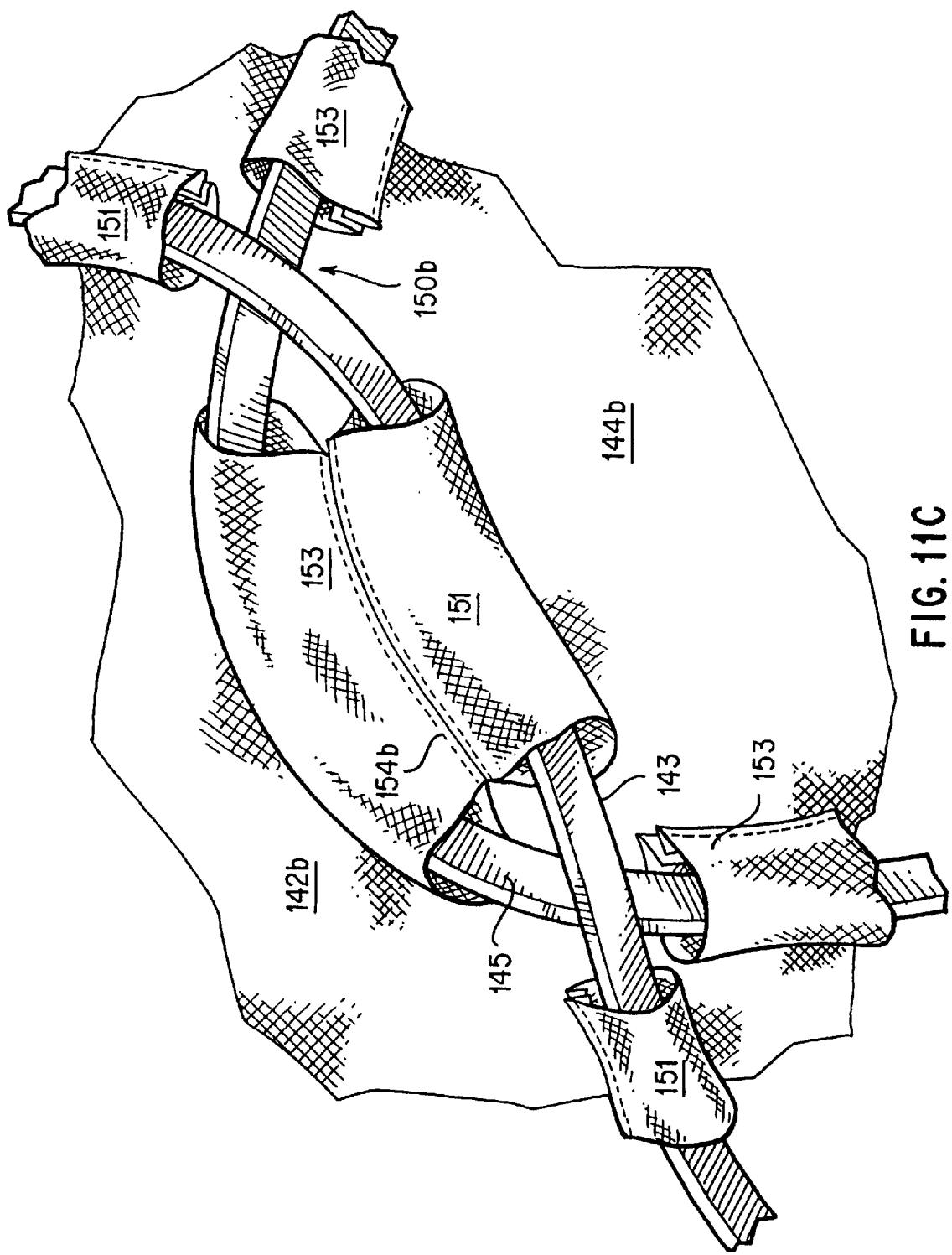
FIG. 11C illustrates an alternative embodiment of the section of the structure of FIG. 11A at the overlapping points and the stitch line.
Figure 11D:
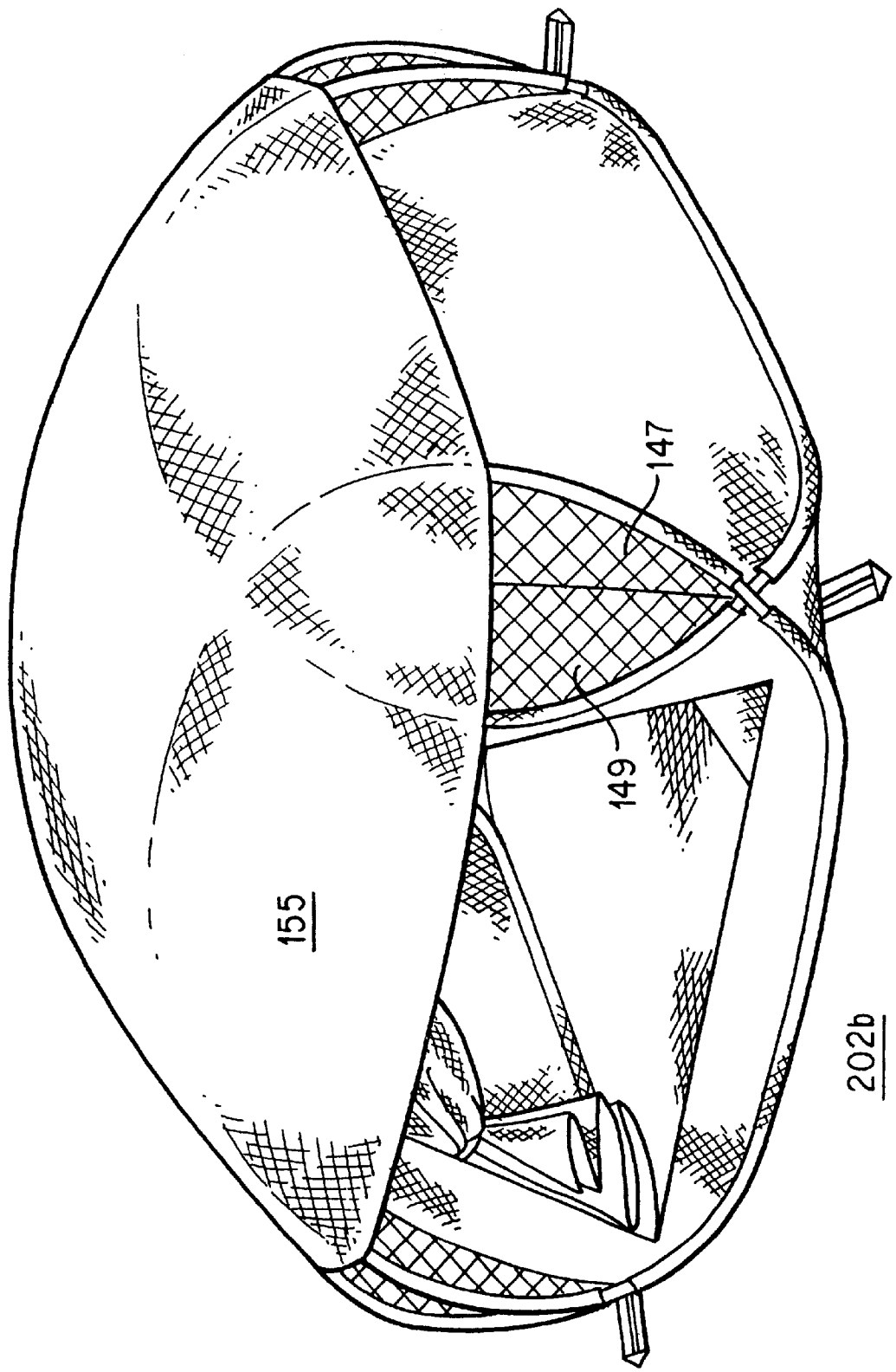
FIG. 11D illustrates a canopy deployed with the structure of FIG. 11A.

The configuration illustrated in FIG. 11B can be modified to the configuration shown in FIG. 11C. In FIG. 11C, the fabric portions 147, 149 are omitted so that the sleeves 151 and 153 of the panels 142b and 144b, respectively, can be stitched together by the stitch line 154b.

As explained throughout the disclosure, the overlapping or crossing of a pair of loop members provides added stability and structural support to the structure at the overlapping points.

The configurations illustrated in FIGS. 11B and 11C allow the degree and nature of the stability and support to be varied and adjusted. In addition, the distance or degree to which the fabric portions 147, 149 extend from the stitch line 154b can be varied for many different purposes. For example, if the overlapping points of the structure 202b is used to provide external support for a canopy or roof 155, as shown in FIG.

11D, then the fabric portions 147, 149 can be made to extend a greater distance from the stitch line 154*b* to provide a larger shaded area under the canopy 155 outside of the structure 202*b*. The canopy 155 can be a piece of fabric or other material having water-proof and/or heat-repelling properties.

The structure 202*b* can be folded and collapsed, as well as re-deployed to the fully expanded configuration, according to the same methods utilized for the structure 140 described above in FIGS. 9A–9C.

Figure 10:
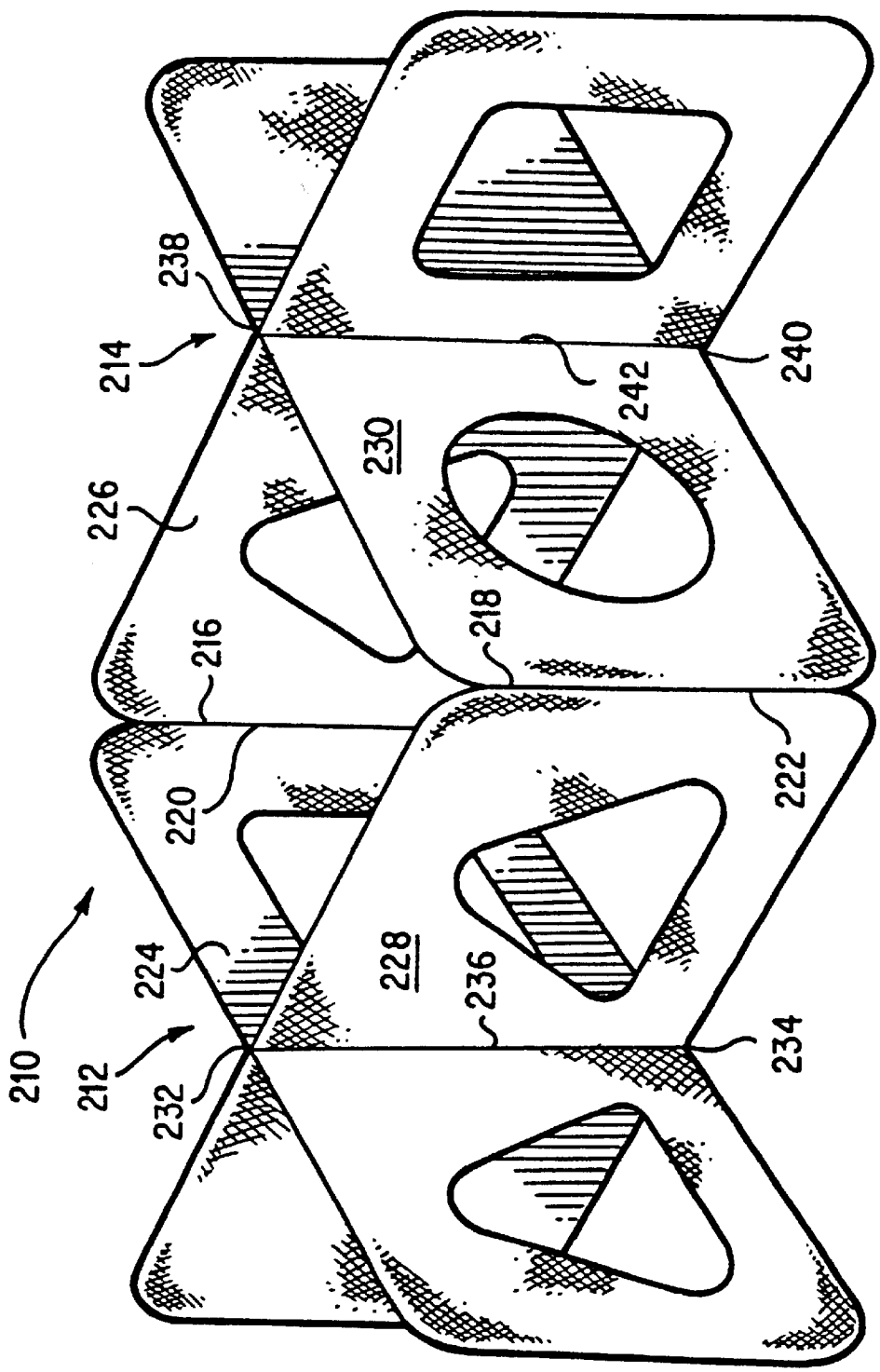
FIG. 10 is a perspective view of a structure according to yet a further embodiment of the present invention illustrated in an expanded configuration.

In addition, it is possible to combine a plurality of the structures to provide structures with different sizes and configurations, thereby increasing the variety of use and play. As a non-limiting example, FIG. 10 illustrates a structure 210 that is made up of two separate substantially "+" or cross-shaped structures 212 and 214 connected to each other along adjacent side edges 216 and 220 of panels 226 and 224, respectively, and adjacent side edges 218 and 222 of panels 230 and 228, respectively. The connection along the side edges may be made permanent by applying stitching, or may be made detachable by using conventional detachable attachment devices, such as snaps, hooks or VELCRO™. Each structure 212 and 214 has two separate panels 224, 228 and 226, 230 respectively, each connected by one interconnecting hinge mechanism which includes the overlapping points 232, 234, 238 and 240 and the optional hinge stitches 236 and 242, according to the principles described hereinabove. The overall structure 210 may be a partition structure having one enclosed space and a plurality of other non-enclosed spaces. Alternatively, fabric roofs may be stitched or otherwise connected to all portions, or certain specific portions, of the structures 212 and 214 to provide either a full or a partial shade structure.

Figure 12A:
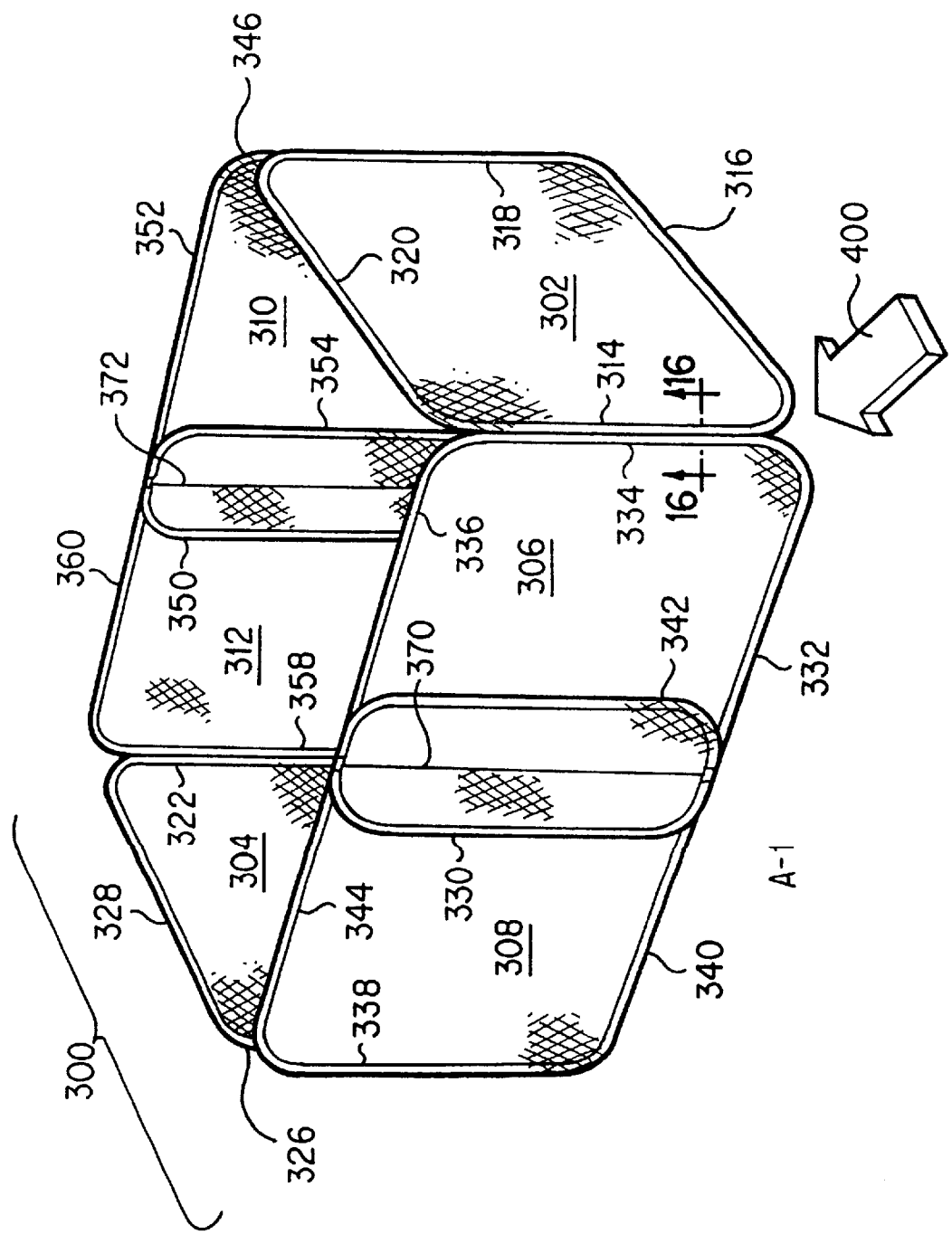
FIG. 12A is a perspective view of a structure according to another embodiment of the present invention illustrated in an expanded configuration.
Figure 12C:
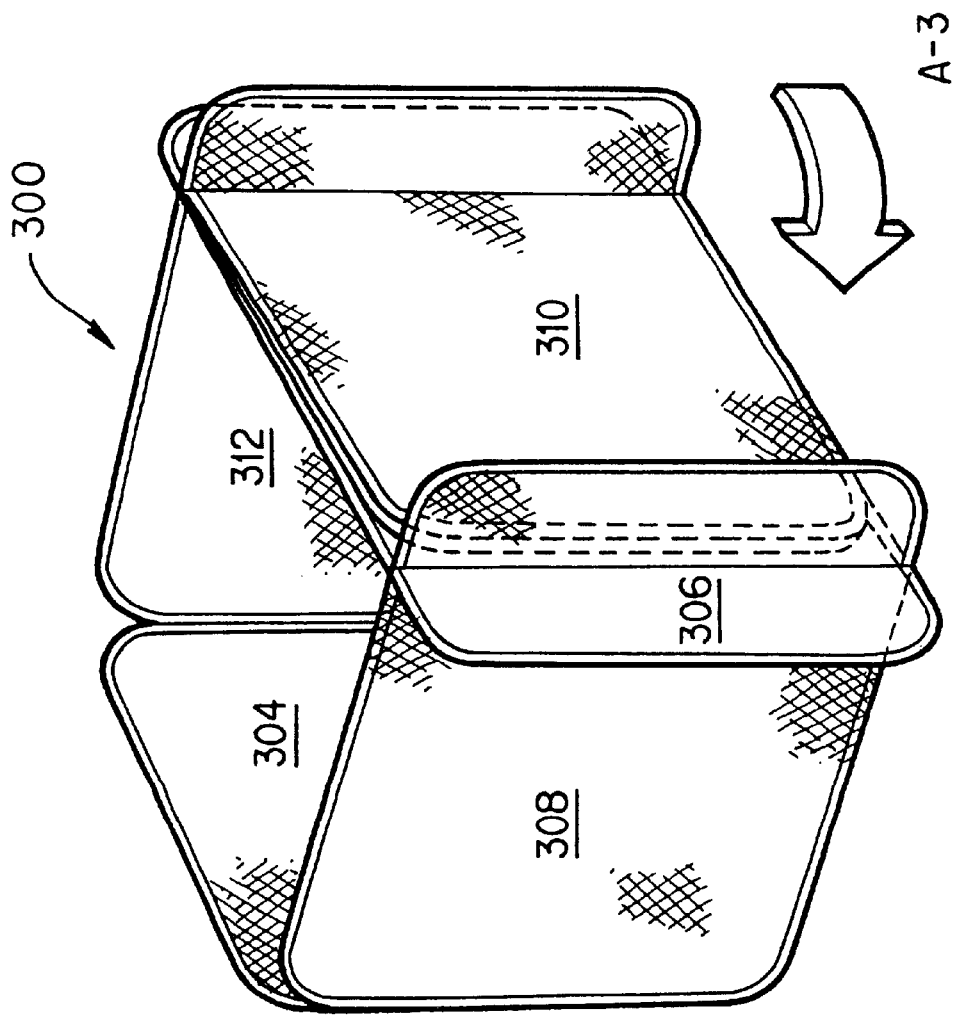
Figure 12D:
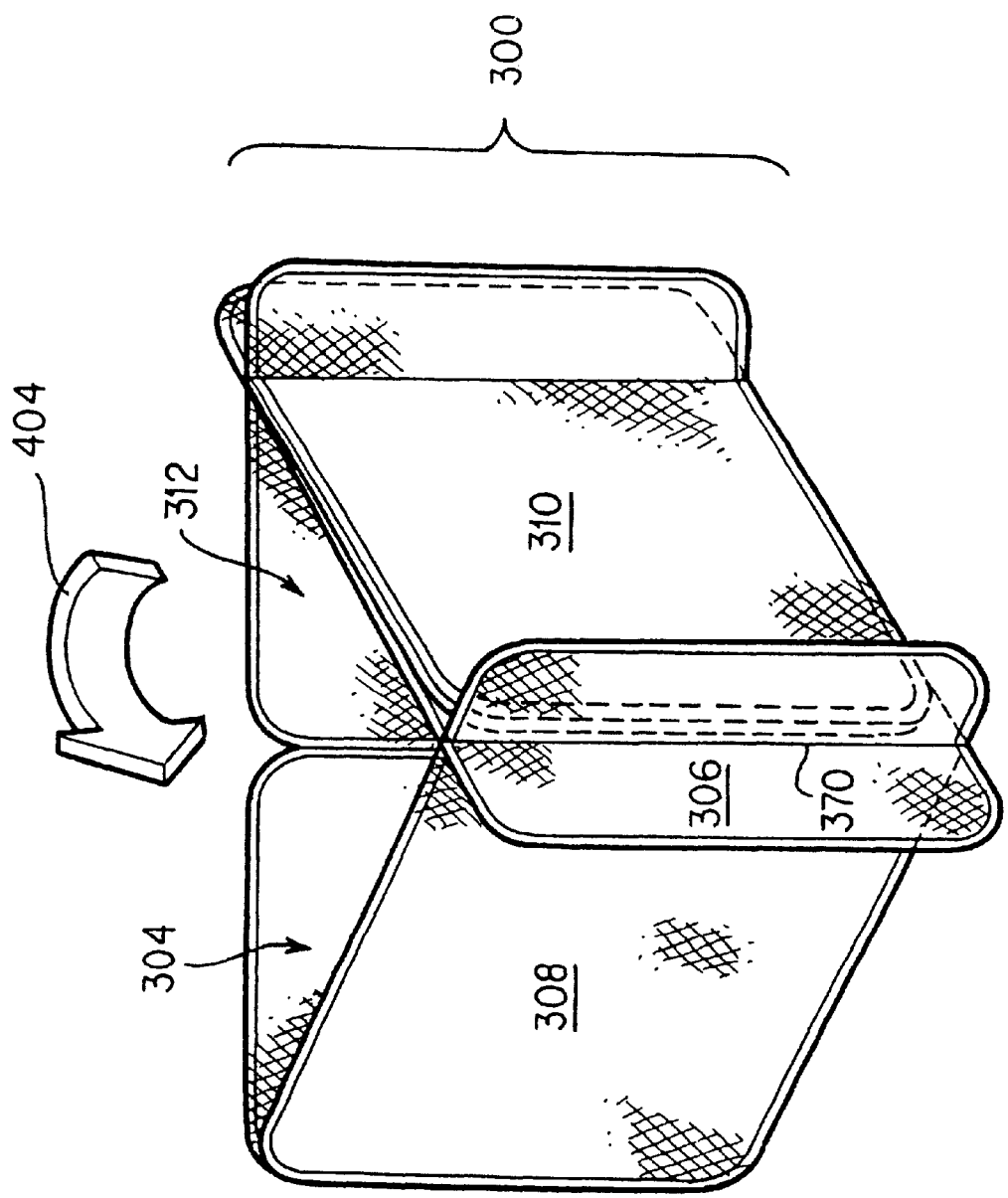

The principles of the present invention can also be used to extend the length of a panel for a larger structure. For example, the individual module shown and illustrated in U.S. Pat. No. 5,560,385 can be elongated by providing one of the side panels with a pair of overlapping panels according to the present invention. Referring to FIG. 12A, a structure 300 has a first end panel 302 and a second end panel 304 opposite to the first end panel 302. The structure further includes first and second left panels 306 and 308, and first and second right panels 310 and 312.

The first end panel 302 has a left side 314, a bottom side 316, a right side 318 and a top side 320. The second end panel 304 has a left side 322, a bottom side 324 (not shown), a right side 326 and a top side 328. The first left panel 306 has a left side 330, a bottom side 332, a right side 334 and a top side 336. The second left panel 308 has a left side 338, a bottom side 340, a right side 342 and a top side 344. The first right panel 310 has a left side 346, a bottom side 348 (not shown), a right side 350 and a top side 352. The second right panel 312 has a left side 354, a bottom side 356 (not shown), a right side 358 and a top side 360.

Each end panel 302 and 304 has a continuous loop retaining sleeve 380 provided along and traversing the four edges of its four sides. See FIG. 16A. A continuous loop member 382, which can be the same as the loop member 22 described above in connection with FIGS. 1–3, is retained or held within each retaining sleeve 380 to support each end panel 302 and 304. Fabric or sheet material extends across each end panel 302, 304 and is held taut by the respective loop member 382 when in its open or expanded position. The loop members 382 may be merely retained within the respective retaining sleeves 380 without being connected thereto. Alternatively, the retaining sleeves 380 may be mechanically fastened, stitched, fused, or glued to the loop members 382 to retain them in position.

Each pair of the left panels 306 and 308, and the right panels 310 and 312, is connected in the same overlapping manner as the pair of panels 52 and 54 described above in connection with FIGS. 1–3. Specifically, the left panels 306 and 308 are overlapped adjacent the left side 330 of the first left panel 306 and the right side 342 of the second left panel 308 along stitch or pivot line 370, and the right panels 310 and 312 are overlapped adjacent the left side 354 of the second right panel 312 and the right side 350 of the first right panel 310 along stitch or pivot line 372. In addition, the left side 314 of the first end panel 302 is hingedly connected to the right side 334 of the first left panel 306, and the right side 318 of the first end panel 302 is hingedly connected to the left side 346 of the first right panel 310. Similarly, the left side 322 of the second end panel 304 is hingedly connected to the right side 358 of the second right panel 312, and the right side 326 of the second end panel 304 is hingedly connected to the left side 338 of the second left panel 308.

Figure 16B:
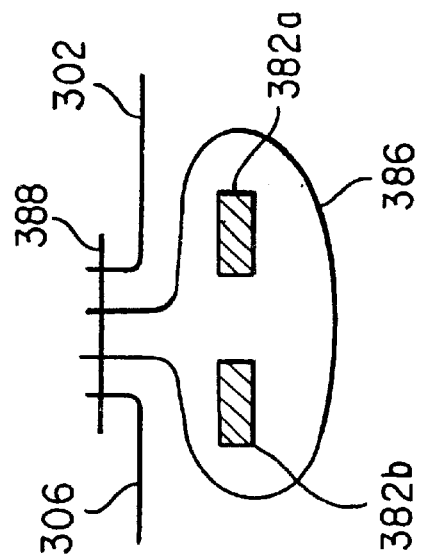
FIGS. 16A and 16B are cross-sectional views of two preferred connections between two adjacent panels of the structure of FIG. 12A taken along line 16—16 thereof.
Figure 16A:
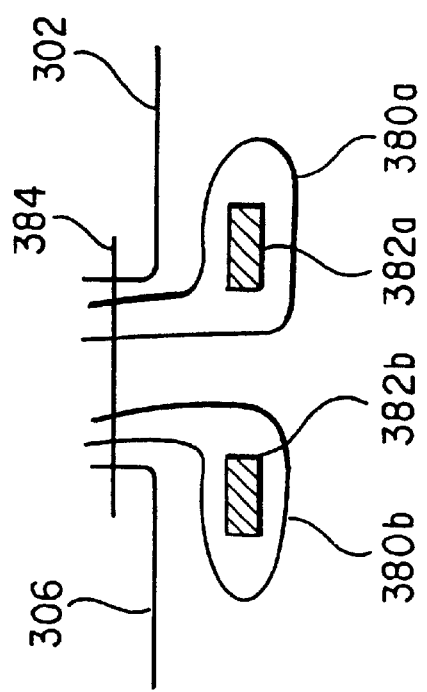

FIG. 16A illustrates one structure and method for hingedly connecting the left side 314 of end panel 302 and the right side 334 of the first left panel 306. The fabric pieces for each panel 302 and 306 are stitched at their edges by a stitching 384 to the respective sleeves 380*a* for panel 302 and 380*b* for panel 306. In FIGS. 16A and 16B, loop member 382*a* represents the loop member for panel 302 and loop member 382*b* represents the loop member for panel 306. Each sleeve 380*a*, 380*b* may be formed by folding a piece of fabric. The stitching 384 also acts as a hinge for the panels 302 and 306 to be folded upon each other, as explained below. At the top side 320, 328 and the bottom side 316, 324 of each end panel 302, 304, respectively, where there is no hinge connection to an adjacent panel, the retaining sleeve 380 may be formed by merely folding over the corresponding fabric piece and applying a stitching. The fabric piece for the corresponding end panel 302, 304 may then be stitched to the sleeve 380.

FIG. 16B illustrates another structure and method for hingedly connecting the left side 314 of end panel 302 and the right side 334 of the first left panel 306. As in the connection of FIG. 16A, the fabric pieces are folded over at their edges at bottom sides 316 and 332, and at top sides 320 and 336, to define the respective sleeves 380. However, the retaining sleeves 380 for each panel 302, 306 converge at, or are connected to, one sleeve portion which interconnects panels 302, 306 to form a singular retaining sleeve 386 which retains the loop members 382*a* and 382*b*. Sleeve 386 may be formed by providing a tubular fabric, or by folding a piece of fabric, and applying a stitching 388 to its edges to connect the sleeve 386 to the fabric pieces of the panels 302, 306. Stitching 388 acts as a hinge for the panels 302, 306. The other hinged connections of adjacent sides may be identical to those illustrated in either FIG. 16A or FIG. 16B.

FIGS. 12A–12D illustrate how the structure 300 can be folded and collapsed into a smaller size. In the first step, the hinged connection between the left side 314 of end panel 302 and the right side 334 of the first left panel 306 is pushed in (see arrow 400 in FIG. 12A) about the hinged connection so that end panel 302 collapses upon the first right panel 310 and the first left panel 306 is disposed generally parallel to the second end panel 304 (see FIG. 12B). In the second step, the panels 302 and 310 are then pivoted about the hinges defined by the stitch line 372 and the hinged connection between the left side 314 of end panel 302 and the right side 334 of the first left panel 306 (see arrow 402 in FIG. 12B) so that the panels 302 and 310 are collapsed onto the first left panel 306 (see FIG. 12C). At this point, the structure 300 has been reduced to a structure that is about half the size of the original structure 300. In the third step, panels 304 and 312 are pushed in about their hinged connection (see arrow 404 in FIG. 12D) such that end panel 304 collapses upon second left panel 308 and second right panel 312 collapses upon first left panel 306. Then, in the fourth step, the two combined panels 304 and 308 are pivoted about the hinges defined by the stitch line 370 and the hinged connection between the left side 322 of end panel 304 and the right side 358 of the second right panel 312 so as to be collapsed upon the stack of the other panels 312, 306, 302 and 310 (in that order). This creates a single stack of the six panels 308, 304, 312, 306, 302 and 310 (in that order). The folding and collapsing steps illustrated in FIGS. 5A–5E can then be used to fold and collapse this stack of panels into a size which is a fraction of the original size of the structure 300.

To deploy the structure 300 back to the expanded, fully deployed position, the panels 302, 304, 306, 308, 310, 312 and their associated loop members 382 are unfolded. The resiliency and spring force of the loop members 382 will cause the loop members 382, and their associated panels 302, 304, 306, 308, 310, 312, to spring open to the expanded configuration. The different panels 302, 304, 306, 308, 310, 312 can then be pivoted about their hinges to deploy the structure 300 in its original expanded configuration. The other structures described herein can also be deployed to their respective expanded, fully deployed positions by the resiliency and spring force of their respective loop members, which cause the loop members and their associated panels to spring open to the expanded configuration when the collapsed panels are unfolded.

As a result, the panels 302, 304, 306, 308, 310 and 312 are connected to each other to define an enclosed space surrounded by four walls. Two of the shorter walls are defined by the end panels 302 and 304, while each of the other two, longer, walls is defined by a pair of overlapped panels 306 and 308, or 310 and 312. Thus, the overlapped panels 306, 308 and 310, 312 operate to extend the length of the left and right sides of structure 300. This is advantageous over providing elongated left and right panels, since elongated panels can be difficult to grip, and to fold and collapse. By providing overlapping panels, the panels can be folded on to each other to initially reduce the overall size of the elongated sides, and the overlapped stack of panels can then be further folded and collapsed to reduce the size of the structure 300. In addition, the overlapping portions of the overlapped panels provide structural stability to the extended sides formed by these overlapped panels. In this regard, it is also possible to provide an elongated side that is comprised of three or more panels, such as illustrated in connection with FIGS. 6 and 7. Further, the lengths, sizes and shapes of the overlapped panels can be varied. For example, the left panels 306, 308 can have different sizes, with one being longer or larger than the other.

Figure 13:
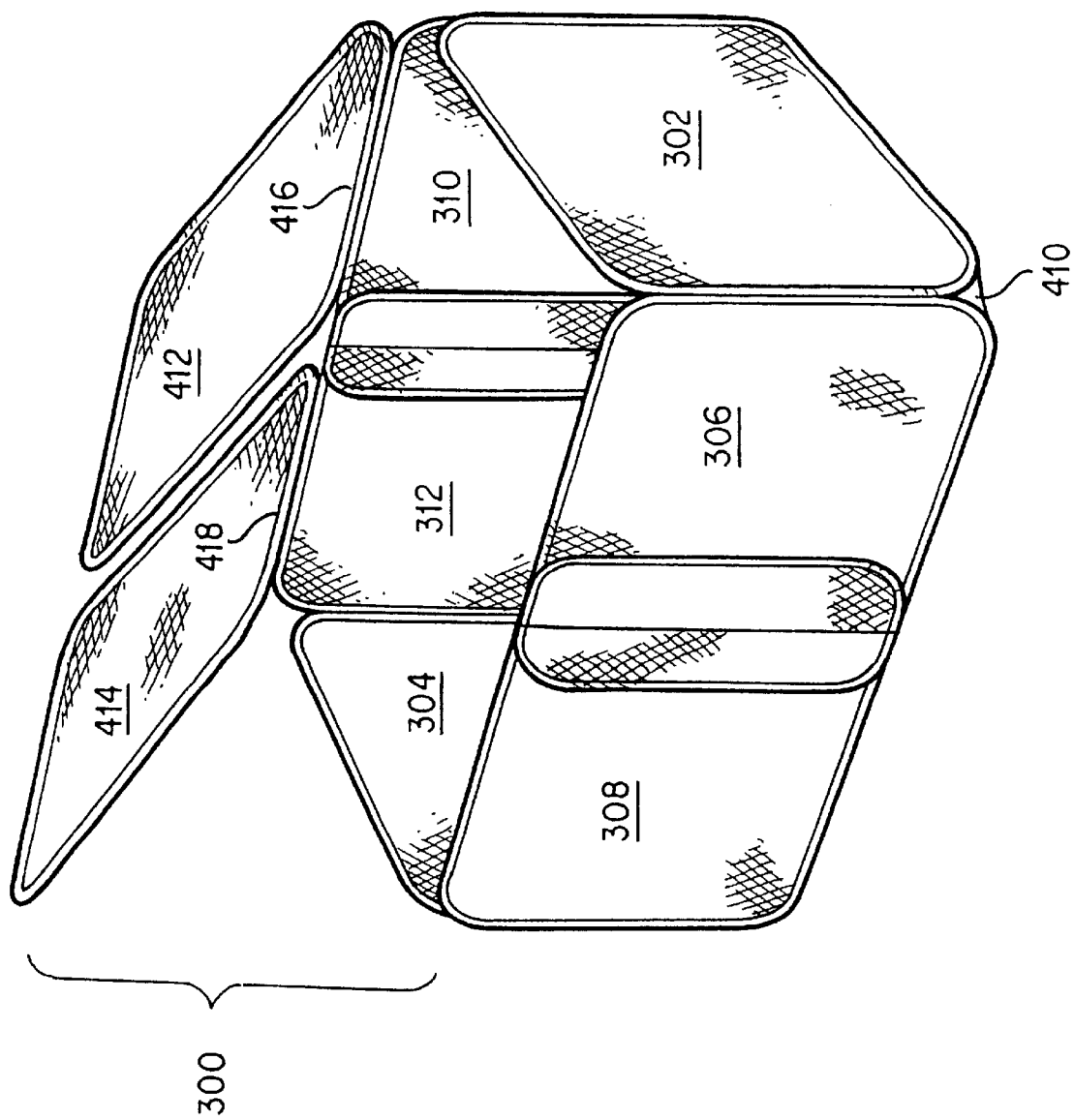
FIG. 13 is a perspective view of a structure according to another embodiment of the present invention illustrated in an expanded configuration, which represents a modification to the structure of FIG. 12A.

FIG. 13 illustrates the structure 300 modified for use as a container (e.g., a box). A floor 410 is provided in the form of a fabric that is stitched or otherwise connected to the bottom sides 316, 324, 332, 340, 348 and 356 of the panels 302, 304, 306, 308, 310 and 312, respectively. In addition, a first lid 412 and a second lid 414 are provided. Each lid 412 and 414 can take the form of a panel having a structure that is the same as the end panels 302 and 304. One side 416 and 418 of the lids 412, 414 is hingedly attached (using one of the structures and methods illustrated in FIGS. 16A and 16B) to the top sides 352 and 360 of the right panels 310 and 312, respectively. Each lid 412, 414 is preferably sized and configured to cover the top of the space between opposing right and left panels. In addition, latching, attachment or locking mechanisms can be provided to secure the lids 412, 414 against the top sides 336, 344 of the left panels 306, 308, respectively. Thus, the enclosed space can be used to hold or store any desired object(s). To fold and collapse the structure 300 in FIG. 13, the lids 412 and 414 are additionally folded over their hinged connections with the right panels 310 and 312, respectively, to create a stack of eight panels that is folded and collapsed according to the method described above in connection with FIGS. 12A–12D and 5A–5E.

Figure 14:
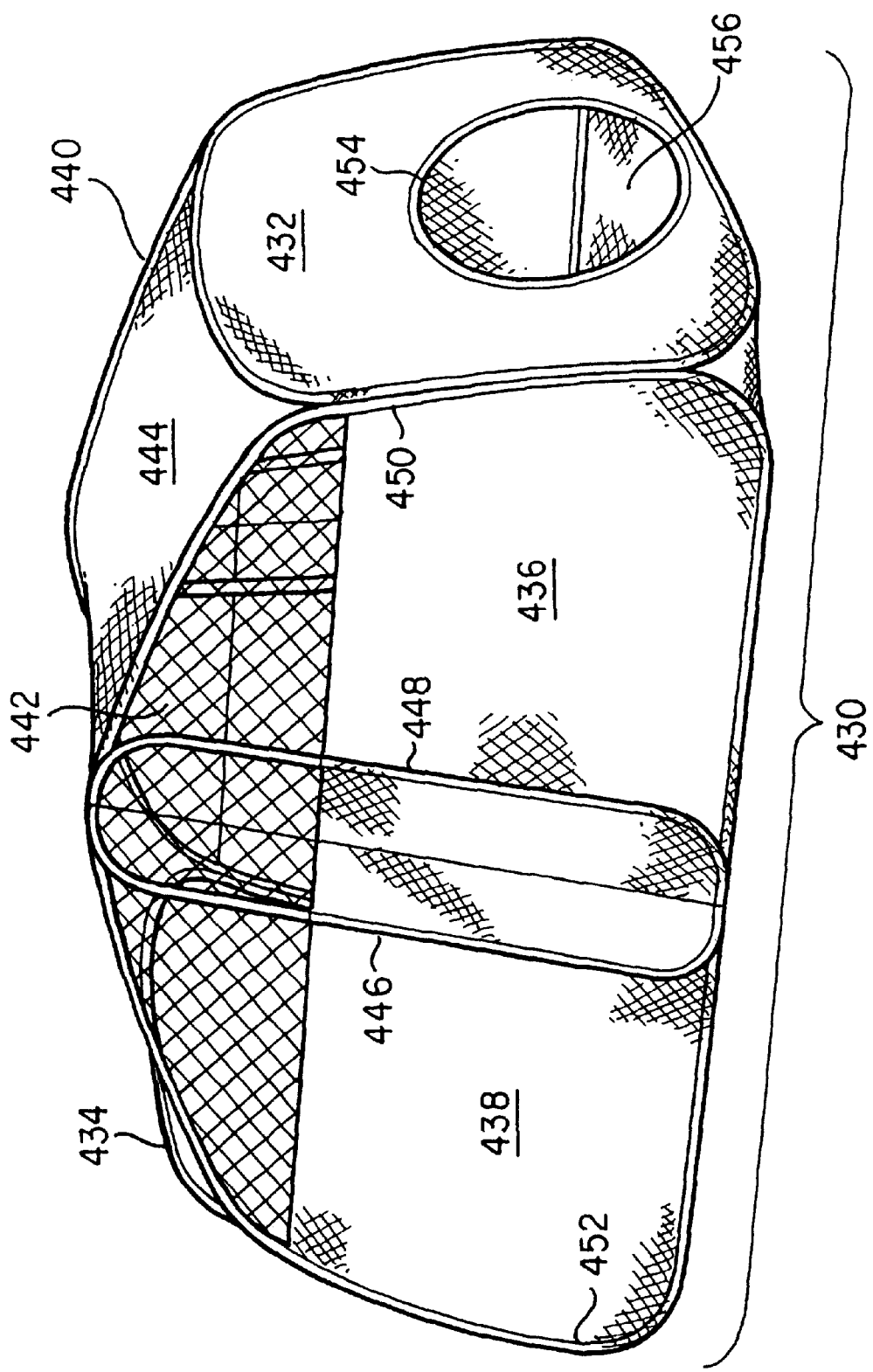
FIG. 14 is a perspective view of a structure according to another embodiment of the present invention illustrated in an expanded configuration.

The principles of the structure 300 can be further utilized to provide collapsible structures for a wide variety of applications. One such example is illustrated by the shade structure 430 of FIG. 14, which is similar to the structure 300, and has a first end panel 432, a second end panel 434 opposite to the first end panel 432, first and second left panels 436 and 438, and first and second right panels 440 and 442. The panels 432, 434, 436, 438, 440 and 442 may be provided in slightly different shapes and sizes when compared to the corresponding panels 302, 304, 306, 308, 310, 312 in structure 300, but these panels 432, 434, 436, 438, 440 and 442 are otherwise structured and connected in the same manner as the panels 302, 304, 306, 308, 310, 312, respectively, in structure 300. In this regard, the first and second left panels 436 and 438 are connected in an overlapping manner, and the first and second right panels 440 and 442 are also connected in an overlapping manner. In addition, the end panels 432 and 434 are hingedly connected to their adjacent left and right panels 436, 438, 440 and 442.

The shade structure 430 additionally includes a raised roof 444 which is made from a fabric material connected to the top sides of the panels 432, 434, 436, 438, 440 and 442. Since the left side 446 of the first left panel 436 and the right side 448 of the second left panel 438 are longer than the right side 450 of the first left panel 436 and the left side 452 of the second left panel 438, the center of the structure 300 is higher so that the roof 444 becomes raised as it extends from the end panels 432, 434 towards the center of the structure 300. An opening 454 can be provided in one or both end panels 432, 434 to provide ingress and egress to the interior of the shade structure 300. An optional floor 456, which can be made from a fabric material, can also be connected to the bottom sides of the panels 432, 434, 436, 438, 440 and 442.

Figure 14A:
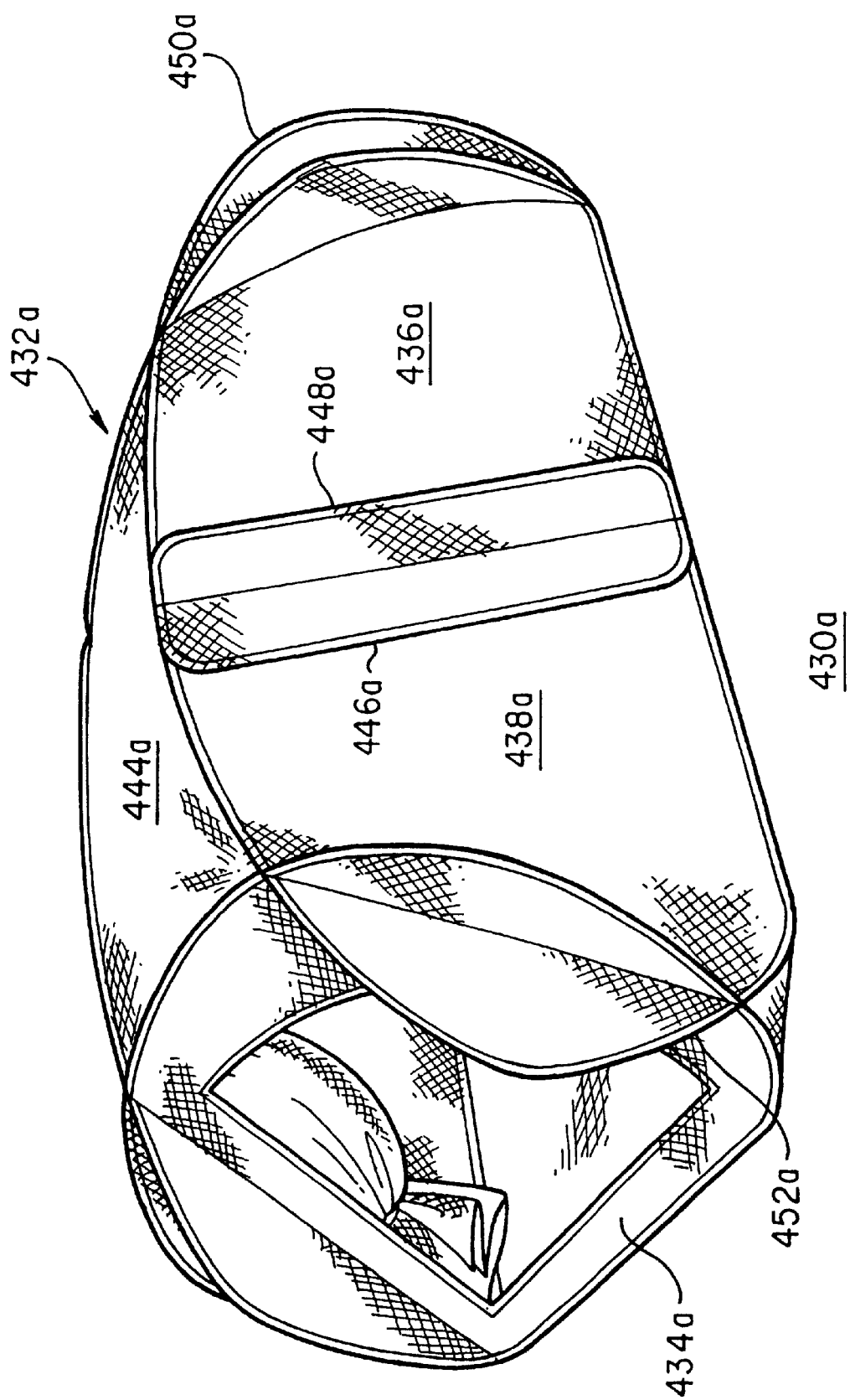
FIG. 14A is a perspective view of a structure according to another embodiment of the present invention illustrated in an expanded configuration, which represents a modification to the structure of FIG. 14.

FIG. 14A illustrates a modification to the structure 430, in which all of the adjacent sides of all the panels 432a, 434a, 436a, 438a, 440a and 442a are connected in an overlapping manner. The elements of the structure 430a that are the same as the elements of the structure 430 are provided with the same numeral designations except that an "a" has been added to the numeral designations in FIG. 14A. Thus, the end panels 432a and 434a are not hingedly connected to their adjacent left and right panels 436a, 438a, 440a and 442a, but are instead connected in an overlapping manner.

Figure 14B:
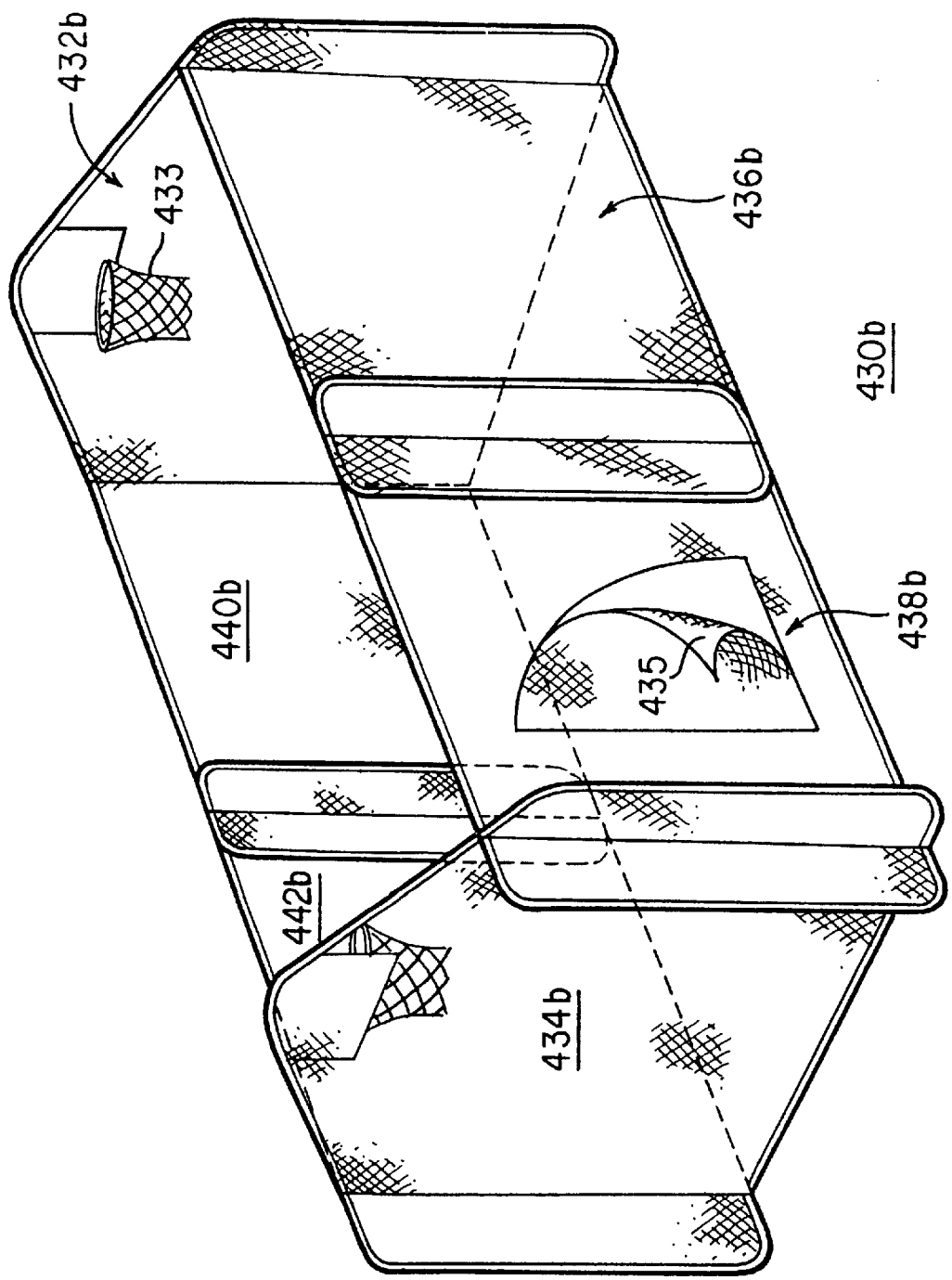
FIG. 14B is a perspective view of a structure according to another embodiment of the present invention illustrated in an expanded configuration, which represents a modification to the structure of FIG. 14A.

FIG. 14B illustrates a modification to the structure 430a, in which the roof 444a has been removed, and the end panels 432b and 434b provided with a different shape having a higher top edge and receiving a netting 433 in the form of a basket on the inner sides of the end panels 432b, 434b. The elements of the structure 430b that are the same as the elements of the structure 430a are provided with the same numeral designations except that a "b" has been added to the numeral designations in FIG. 14B. Thus, the structure 430b has been converted into an enclosed basketball court. A large door 435 can be provided in (e.g., cut from) the fabric of one of the side panels (e.g., 438b) to allow ingress and egress to and from the basketball court.

Figure 14C:
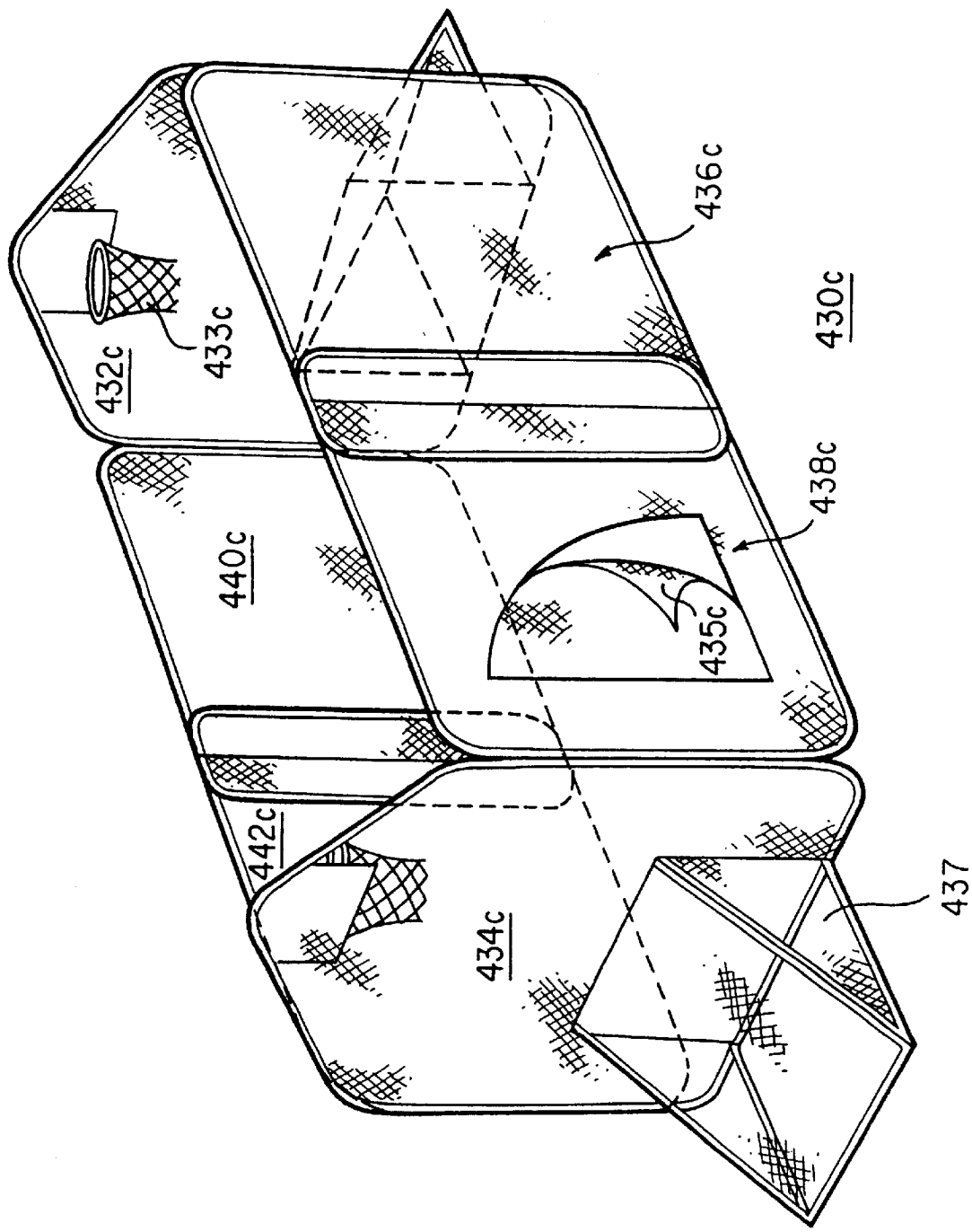
FIG. 14C is a perspective view of a structure according to another embodiment of the present invention illustrated in an expanded configuration, which represents a modification to the structure of FIG. 14B.

FIG. 14C illustrates a modification to the structure 430b that combines the principles of structures 430 and 430b. The elements of the structure 430c that are the same as the elements of the structure 430b are provided with the same numeral designations except that a "c" has been added to the numeral designations in FIG. 14C. Thus, the structure 430c is still an enclosed basketball court, as for structure 430b, but the end panels 432c and 434c are now hingedly connected to their adjacent left and right panels 436c, 438c, 440c and 442c. In addition, nettings 437 in the form of soccer or hockey goals can also be provided at both end panels 432c, 434c so that the structure 430c can also be used as an enclosed soccer or hockey arena. These nettings 437 can be made out of a meshed netting-type material that extend outwardly through openings 439 cut at the bottom of the end panels 432c, 434c.

The structures 430, 430a, 430b and 430c can be folded and collapsed, as well as re-deployed to the fully expanded configuration, according to the same methods utilized for the structure 300 described above.

Figure 15:
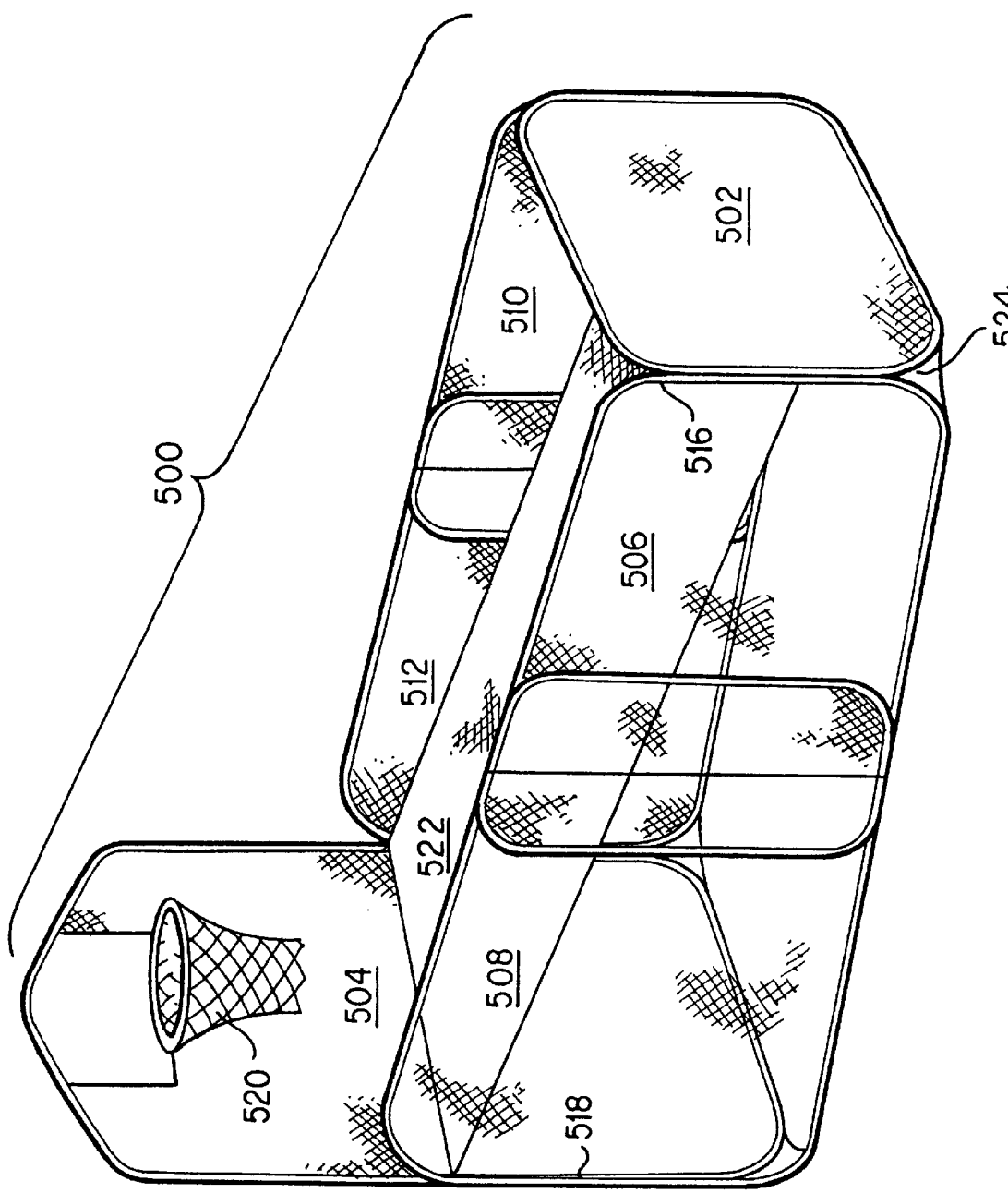
FIG. 15 is a perspective view of a structure according to a further embodiment of the present invention illustrated in an expanded configuration.

As an additional example of how the principles of the structure 300 can be further utilized to provide collapsible structures for a wide variety of applications, FIG. 15 illustrates a collapsible arcade-like or amusement structure 500 which is similar to those described in the present inventor's U.S. Pat. No. 5,722,446. However, the structure 500 provides two elongated side walls which are made up of two overlapping panels. In particular, the structure 500 is similar to the structure 300, and has a front panel 502, a rear panel 504, first and second left panels 506 and 508, and first and second right panels 510 and 512. The panels 502, 504, 506, 508, 510 and 512 may be provided in slightly different shapes and sizes when compared to the corresponding panels 302, 304, 306, 308, 310, 312 in structure 300, but these panels 502, 504, 506, 508, 510 and 512 are otherwise structured and connected in the same manner as the panels 302, 304, 306, 308, 310, 312, respectively, in structure 300. In this regard, the first and second left panels 506 and 508 are connected in an overlapping manner, and the first and second right panels 510 and 512 are also connected in an overlapping manner. In addition, the front and rear panels 502 and 504 are hingedly connected to their adjacent left and right panels 506, 508, 510 and 512.

In addition, the left and right panels 506, 508, 510 and 512 are configured so that they slope or angle upwardly from the front panel 502 towards the rear panel 504, so that the right side 516 of the first left panel 506 has a smaller vertical height than the left side 518 of the second left panel 508. The rear panel 504 is significantly higher than the other panels 502, 506, 508, 510, 512, and forms a backboard for a basket 520. The shade structure 500 additionally includes a top fabric 522 which is connected adjacent to, but offset from and below, the top sides of the panels 502, 504, 506, 508, 510 and 512, so that it also slopes upwardly from the front panel 502 towards the rear panel 504. An optional floor 524, which can be made from a fabric material, can also be connected to the bottom sides of the panels 502, 504, 506, 508, 510 and 512.

The structure 500 can be folded and collapsed, as well as re-deployed to the fully expanded configuration, according to the same methods utilized for the structure 300 described above.

In using the amusement structure 500, the user may toss a ball (not shown) at the basket 520. All balls passing through the basket, or bounced off the backboard (i.e., the rear panel 504), will be returned to the user at the front panel 502 because the sloping or angled nature of the top fabric 522 will cause the ball to roll towards the front panel 502. Since the top fabric 522 is offset from and below the top sides of the panels 502, 504, 506, 508, 510 and 512, the ball will be retained on top of the top fabric 522, but inside the confines of the panels 502, 504, 506, 508, 510 and 512. Additional modifications and amusement features that can be used for the amusement structure 500 are illustrated and described in the present inventor's U.S. Pat. No. 5,722,446, whose entire disclosure is hereby incorporated by this reference as though fully set forth herein.

Figure 17:
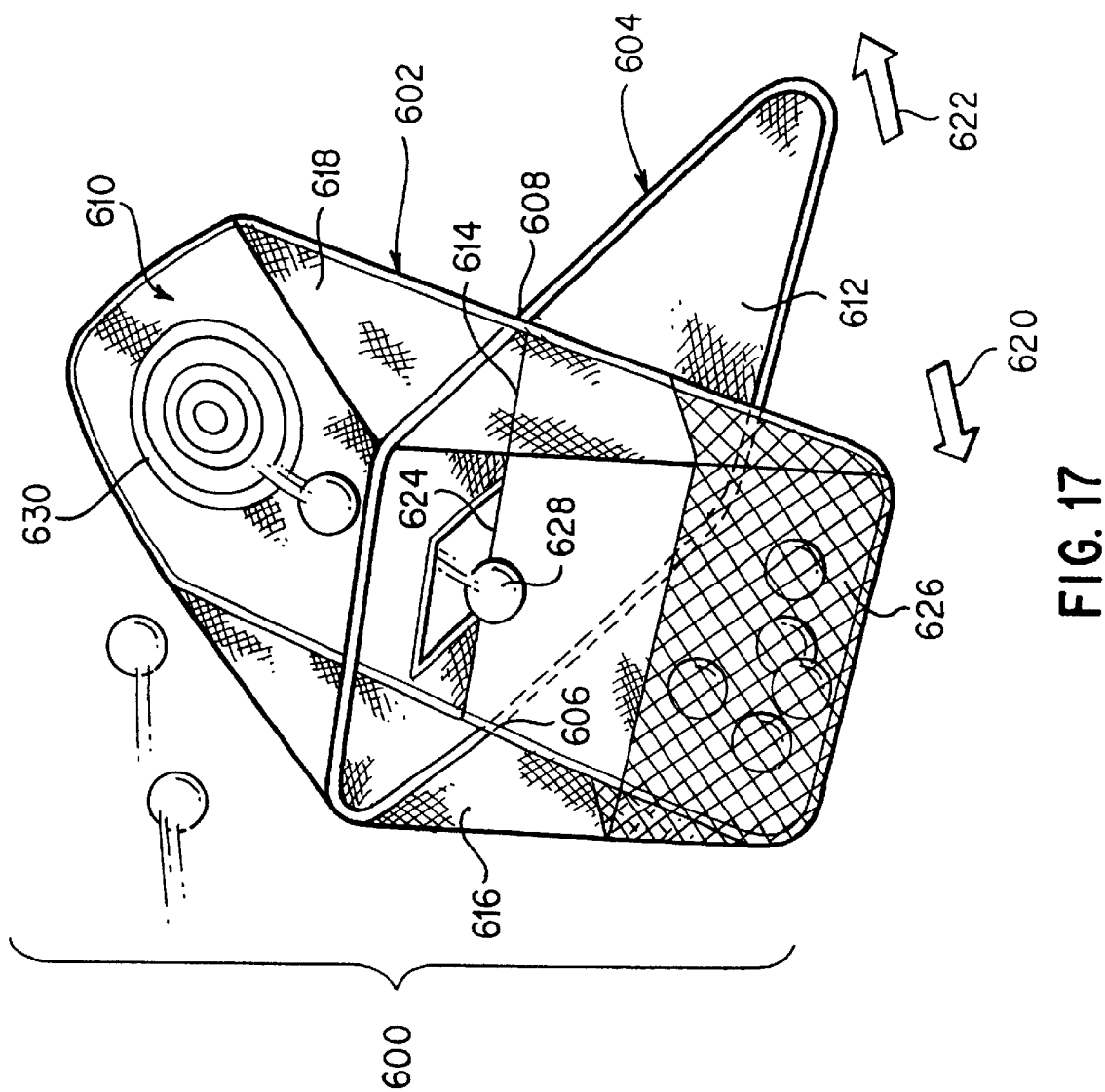
FIG. 17 is a perspective view of a structure according to another embodiment of the present invention illustrated in an expanded configuration.

The principles of the present invention can further be applied to a variety of amusement structures. FIG. 17 illustrates a structure 600 that has a first panel 610 and a second panel 612, each defined by a separate loop member 602, 604, respectively, and having the same construction as panels 52 and 54 and loop members 22 and 24 described above. Panels 610 and 612 are interconnected at overlapping points 606, 608 and stitch line 614 by overlapping their respective loop members 602, 604 in the manner described above.

The structure 600 further includes a left supporting fabric piece 616 that is connected, such as by stitching, to most of the left side of the first panel 610 and the upper left side of the second panel 612, and a right supporting fabric piece 618 that is connected, such as by stitching, to most of the right side of the first panel 610 and the upper right side of the second panel 612. The fabric pieces 616 and 618 define the limits to which the two panels 610, 612 can be pivoted away from each other (i.e., pivoted away in the directions of arrows 620, 622). An opening 624 is provided in the second panel 612 adjacent the stitch line 614. A pocket 626 is stitched or otherwise provided at the lower end of first panel 610. The pocket 626 can be made of a mesh or fabric material, and is adapted to receive a ball 628 that has passed through the opening 624. Specifically, a ball 628 that is tossed at the first panel 610 (e.g., at the "bulls-eye" 630) will hit the first panel 610 and roll down the first panel 610 since the first panel 610 is angled. If the ball 628 rolls through the opening 624, it will continue to roll down the first panel 610 and be collected in the pocket 626. Otherwise, the ball 628 will be collected between the panels 610, 612 at the stitch line 614.

Figure 18:
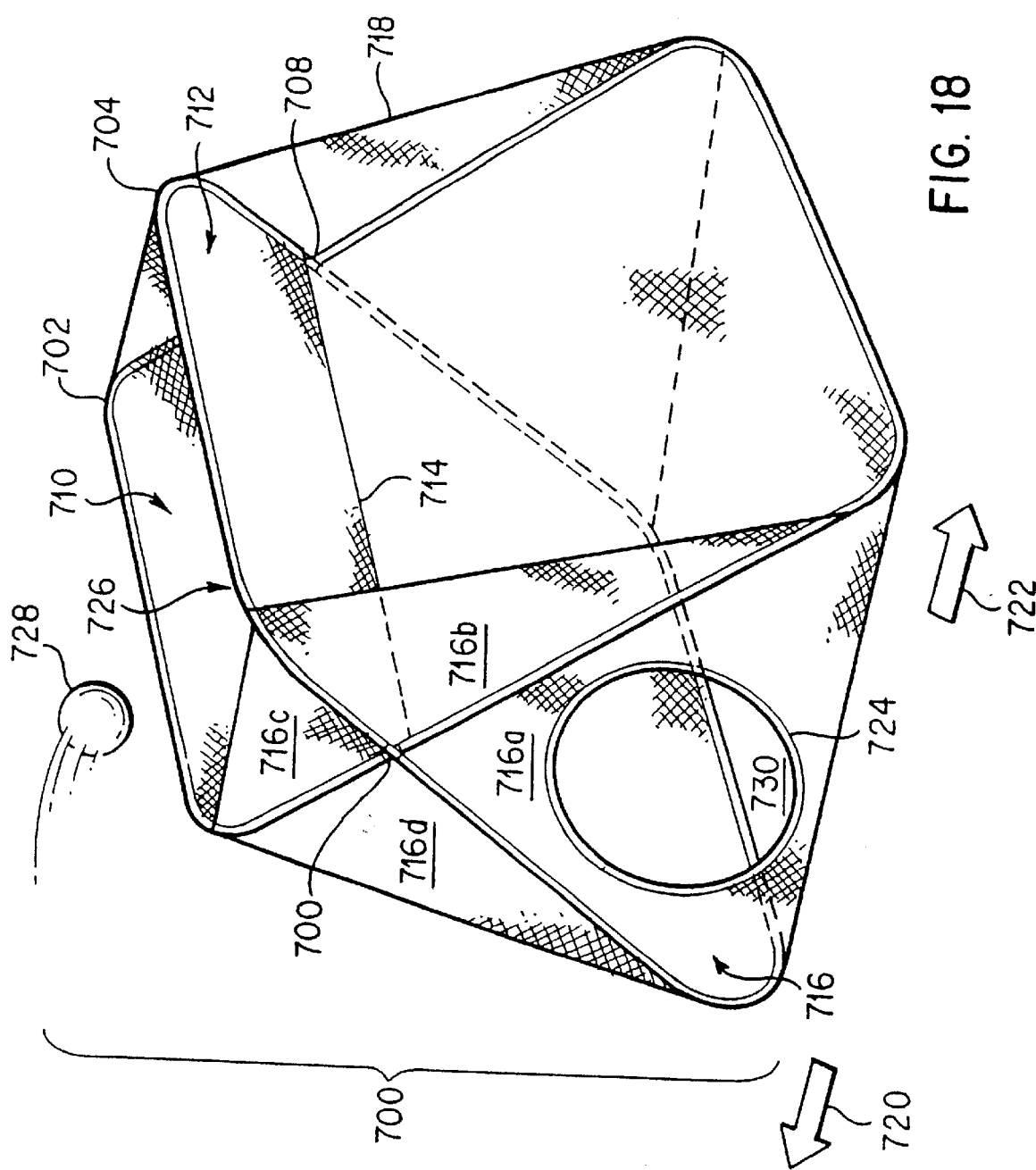
FIG. 18 is a perspective view of a structure according to another embodiment of the present invention illustrated in an expanded configuration.

FIG. 18 illustrates another amusement structure 700 that utilizes the principles of the present invention. The structure 700 has a first panel 710 and a second panel 712, each defined by a separate loop member 702, 704, respectively, and having the same construction as panels 52 and 54 and loop members 22 and 24 described above. Panels 710 and 712 are interconnected at overlapping points 706, 708 and stitch line 714 by overlapping their respective loop members 702, 704 in the manner described above.

The structure 700 further includes a first end fabric piece 716 that is connected, such as by stitching, to most of the left sides of the first panel 710 and the second panel 712, and a second end fabric piece 718 that is connected, such as by stitching, to most of the right sides of the first panel 710 and the second panel 712. Each end fabric piece 716, 718 extends or spans across the space defined by the extremities of the left and right sides of the panels 710, 712 when the structure 700 is in the fully deployed position with the panels 710, 712 fully expanded and pivoted about the overlapping points 706, 708. Each end fabric piece 716, 718 can be provided in a one piece, or in four separate pieces. For example, the end fabric piece 716 can be made up of four separate pieces 716a, 716b, 716c and 716d. The piece 716a extends between the two panels 710, 712 below the overlapping point 706. The piece 716c extends between the two panels 710, 712 above the overlapping point 706. Pieces 716b and 716d extend along opposite exteriors of the left sides of the panels 710, 712. The fabric pieces 716 and 718 define the limits to which the two panels 710, 712 can be pivoted away from each other (i.e., pivoted away in the directions of arrows 720, 722).

In the structure 700, the overlapping points 706 and 708 are not situated at the center of the left and right sides of the loop members 702, 704. Instead, these overlapping points 706 and 708 are situated between the center and the top of the left and right sides of the loop members 702, 704 so as to provide the structure 700 with a wider base and a narrower top.

As a result, the panels 710, 712 and the fabric pieces 716 and 718 define both an interior space below the stitch line 714, and a top receiving well 726 above the stitch line 714. An opening 724 can be provided in one or both end fabric pieces 716, 718 to allow ingress and egress to the interior of the structure 700. An optional floor 730, which can be made of fabric, can be stitched or otherwise connected to the bottom sides of the panels 710, 712. In addition, the receiving well 726 can be adapted to receive light objects 728 that can be tossed at the receiving well 726. Thus, the structure 700 actually provides several play opportunities: the structure 700 can be used as a shade structure, or as an amusement structure 700 with the user tossing light objects 728 into the receiving well 726.

Figure 19:
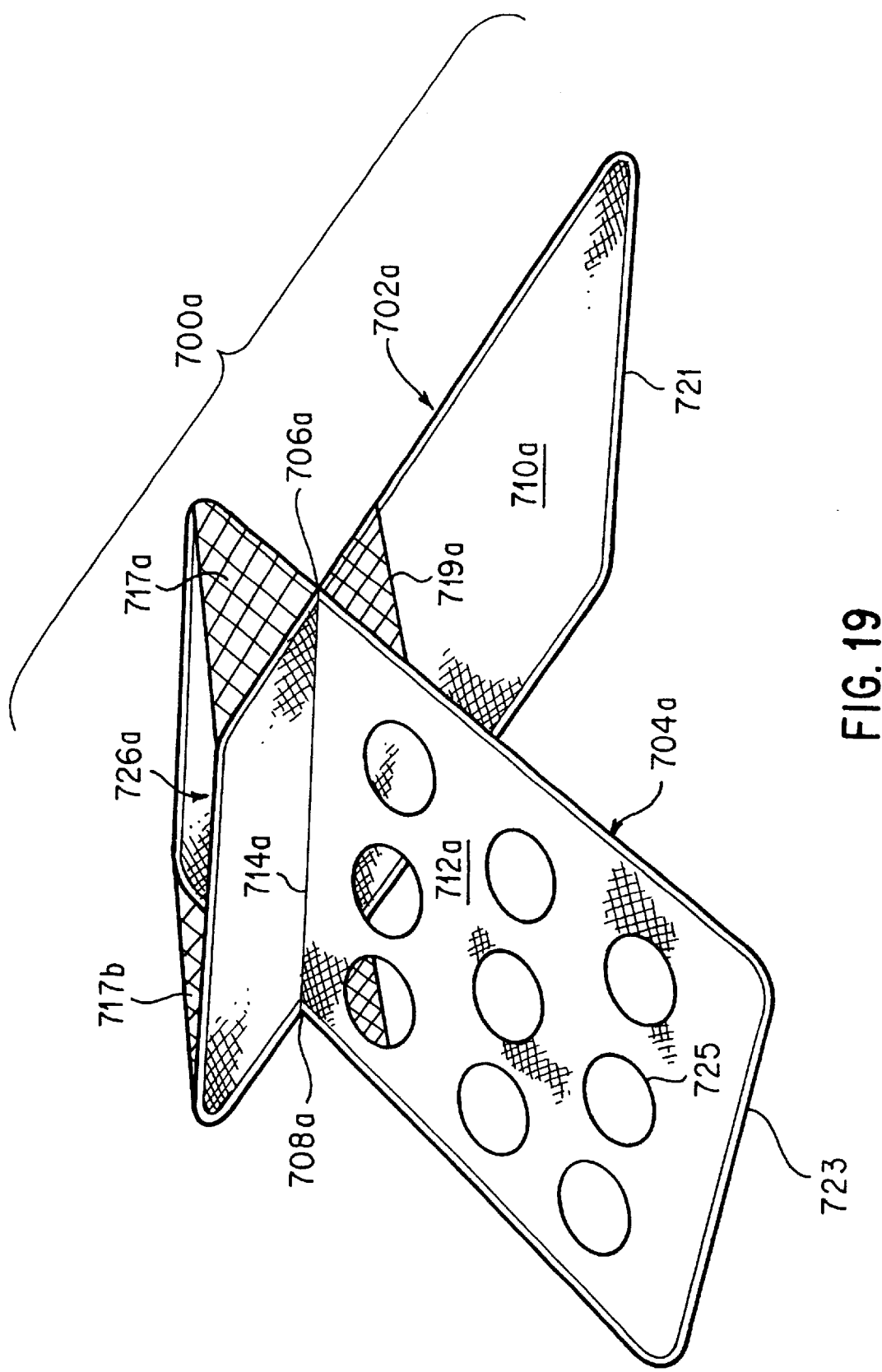
FIG. 19 is a perspective view of a structure according to another embodiment of the present invention illustrated in an expanded configuration.

FIG. 19 illustrates an amusement structure 700a that utilizes the basic principles embodied by the structure 700 in FIG. 18, but which includes certain modifications. The elements of the structure 700a that are the same as the elements of the structure 700 are provided with the same numeral designations except that an "a" has been added to the numeral designations in FIG. 19. The structure 700a includes a first panel 710a and a second panel 712a, each defined by a separate loop member 702a, 704a, respectively, that are configured and overlapped in the same manner as the panels 710, 712 and loop members 702, 704 of structure 700. The difference between the structures 700 and 700a is that the end fabric pieces 716 and 718 in structure 700 are not provided in structure 700a. Instead, a first upper fabric piece 717a is provided and extends between the two panels 710a, 712a above the overlapping point 706a, and a second upper fabric piece 717b is provided and extends between the two panels 710a, 712a above the overlapping point 708a. Each upper fabric piece 717a, 717b is similar to the fabric piece 716c in structure 700, and functions to define the limits to which the panels 702a, 704a can be pivoted away from each other. In other words, the upper fabric pieces 717a, 717b prevent the panels 702a, 704a from spreading outwardly so that the structure 700a can be supported in an upright configuration on a floor or other surface. Optional lower fabric pieces 719a and 719b (not shown) can also be provided to extend for a short distance between the two panels 710a, 712a below the overlapping points 706a and 708a, respectively, to accomplish the same function. As an alternative, the upper fabric pieces 717a and 717b can be omitted in lieu of the lower fabric pieces 719a and 719b. As yet another alternative, instead of the upper and lower fabric pieces 717a, 717b, 719a, 719b, strings or straps (not shown) can be provided to connect the panels 710a, 712a, either slightly above and/or below the overlapping points 706a, 708a, or between the bottom edges 721 and 723 of the panels 710a and 712a, respectively, to accomplish the same function.

When the structure 700a is supported in its upstanding fully deployed configuration with both panels 710a, 712a in their fully expanded configuration, the bottom edges 721 and 723 of the panels 710a and 712a, respectively, contact the ground or surface. One or a plurality of openings 725 are provided in one or both panels 710a, 712a so that a user can toss a ball or other object through a selected one of these openings 725. The ball or object that passes through an opening 725 will be deposited in the space between the panels 710a, 710b, from which the user can then retrieve the ball or object. The panels 710a, 712a and the upper fabric pieces 717a and 717b define a top receiving well 726a above the stitch line 714a.

Thus, while structure 700 is primarily a shade structure, the structure 700a provides a different type of amusement by allowing the user to toss objects through the openings 725. The structure 700a can also be used as a shade structure by a user who positions himself or herself in the enclosed space under the overlapping panels 710a, 710b.

The structures 600, 700 and 700a can be folded and collapsed, as well as re-deployed to the fully expanded configuration, according to the same methods utilized for the structure 20 described above. The fabric pieces 616, 618, 716, 718 and the pocket 626 are made from a flexible material that will fold and collapse together with the fabric of the panels 610, 612, 710, 712, 710a, 712a.

Figure 20:
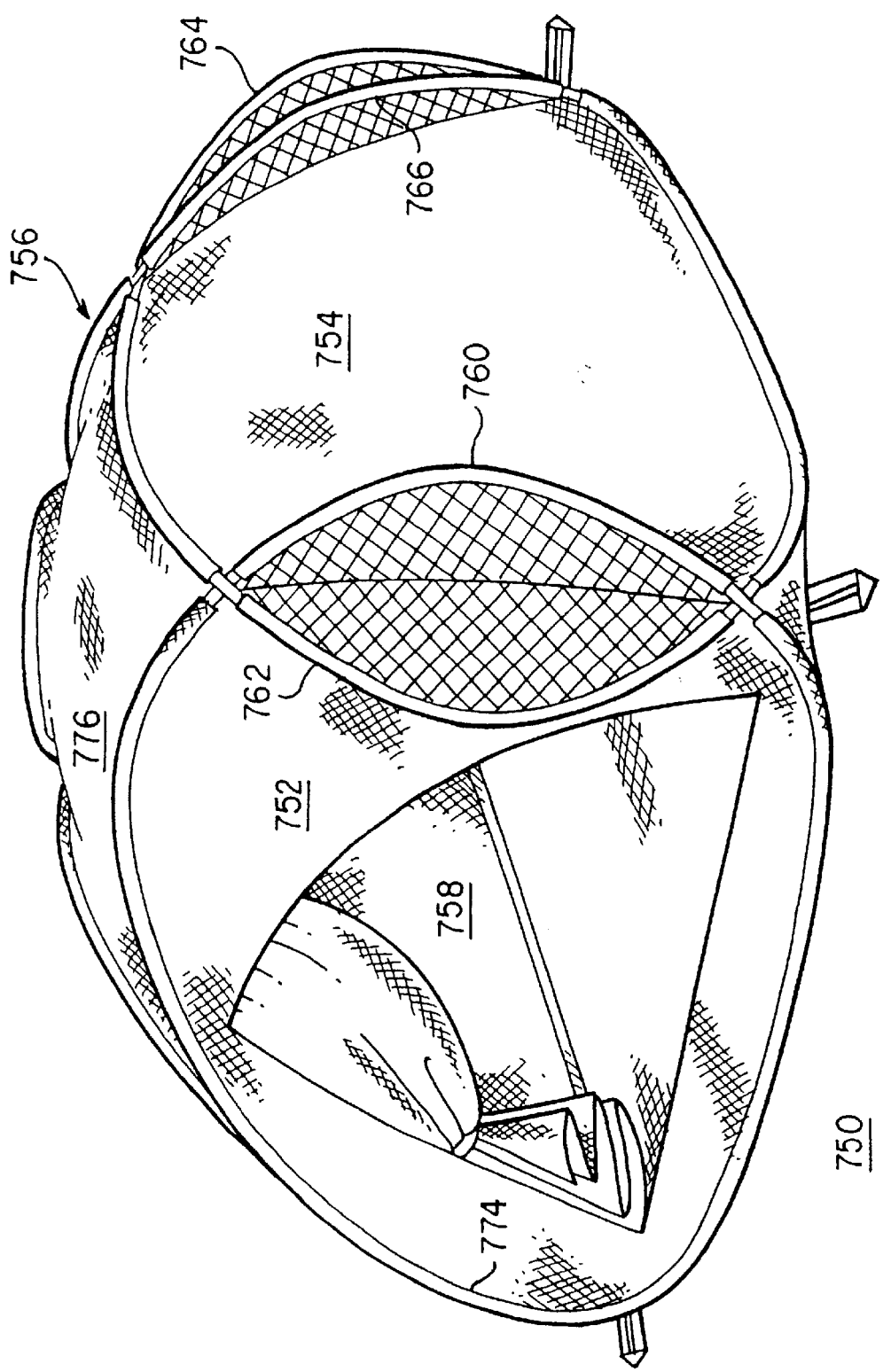
FIG. 20 is a perspective view of a structure according to another embodiment of the present invention illustrated in an expanded configuration.
Figure 21:
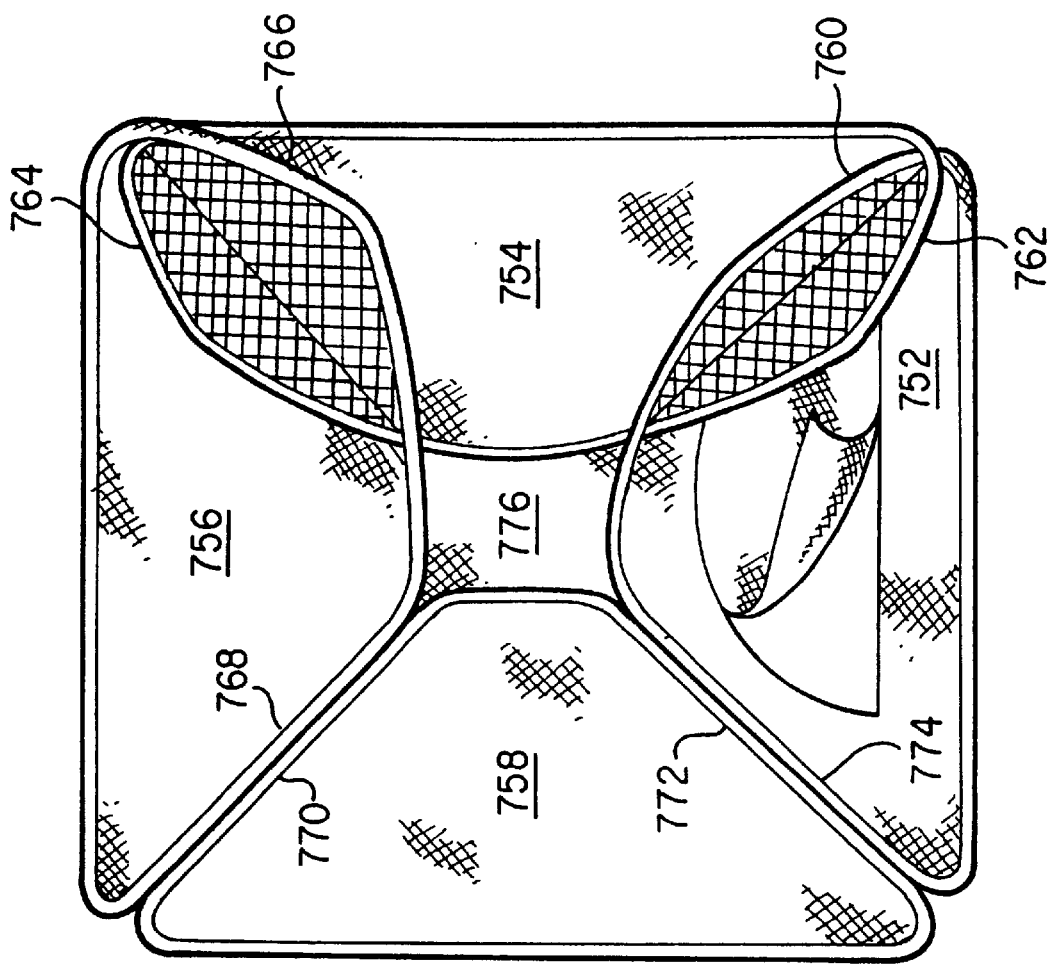
FIG. 21 is a top plan view of the structure of FIG. 20.

It is also possible to provide some of the connections of the adjacent sides of side panels with hinged connections and others with overlapping connections to vary the structural stability and strength of the structure at different parts of the structure. Referring to FIGS. 20 and 21, the structure 750 utilizes principles from the structures illustrated in FIGS. 11A and 14. Structure 750 is similar to structure 202b of FIG. 11A in that structure 750 has four side panels 752, 754, 756 and 758, but of the four connections between adjacent sides of side panels, two are hinged connections and two are overlapping. Specifically, the right side 760 of panel 752 is connected in overlapping manner to the left side 762 of panel 754, the right side 764 of panel 754 is connected in overlapping manner to the left side 766 of panel 756, the right side 768 of panel 756 is hingedly connected to the left side 770 of panel 758, and the right side 772 of panel 758 is hingedly connected to the left side 774 of panel 752. A roof fabric 776 may be attached to the top sides of the panels 752, 754, 756, 758.

Thus, the two overlapping connections between the sides 760 and 762, and sides 764 and 766, provides stronger structural support and stability to the structure 750 on both sides 762, 764 of the panel 754, since the overlapping connections tend to provide stronger support and stability than the hinged connections, as explained hereinabove. The provision of a combination of hinged and overlapping connections allows a larger structure to be provided, since a large structure supported entirely by hinged connections may not be structurally strong and stable for certain applications. On the other hand, hinged connections are less complex and less expensive to make, so it is desirable to provide hinged connections at certain side connections of structures in some applications where it is not necessary for all the connections to be overlapped. The result is that the present invention provides principles which can be utilized to provide structures that can be sized and configured to meet a wide variety of applications and needs. In this regard, although FIGS. 20 and 21 illustrate a particular arrangement for the hinged connections and overlapping connections, these hinged connections and overlapping connections can be provided and arranged between the adjacent sides of any of the panels 752, 754, 756, 758.

Figure 22:
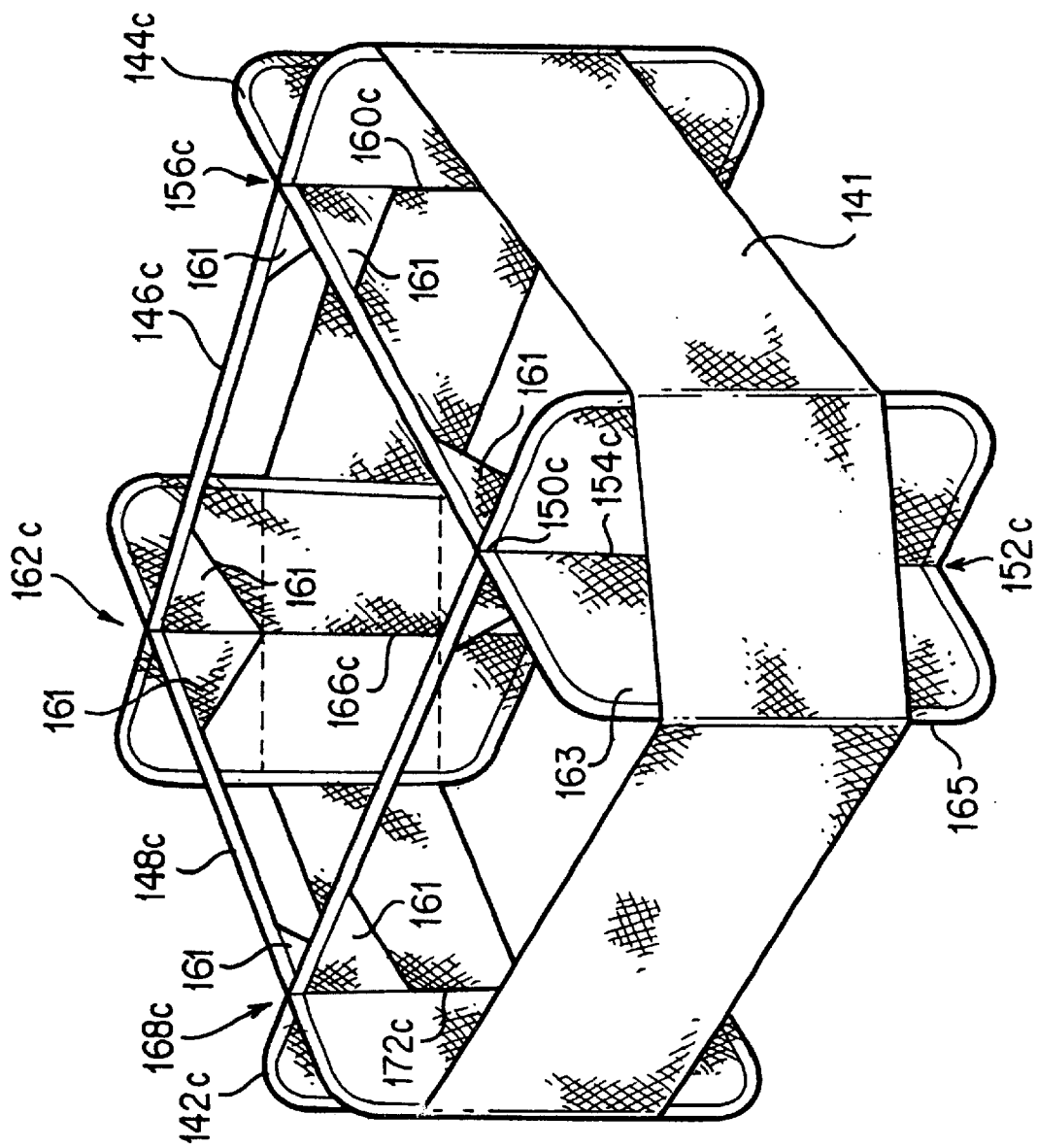
FIG. 22 is a perspective view of a structure according to another embodiment of the present invention illustrated in an expanded configuration.

FIG. 22 illustrates another structure 140c that is similar to structure 140 of FIG. 8, except that portions of the fabric materials for the panels 142, 144, 146 and 148 have been omitted from panels 142c, 144c, 146c and 148c in FIG. 11A, and a separate outer piece of enclosing fabric 141 is provided. The elements of the structure 140c that are the same as the elements of the structure 140 are provided with the same numeral designations except that a "c" has been added to the numeral designations in FIG. 22. The panels 142c, 144c, 146c and 148c of structure 140c are configured in the same manner as panels 142, 144, 146 and 148 of structure 140, except that the openings 196 in structure 140 have been enlarged so that only small fabric corner pieces 161 remain at the corners of the top sides of the panels 142c, 144c, 146c and 148c and the respective overlapping points 150c, 156c, 162c and 168c adjacent the stitch lines 154c, 160c, 166c and 172c. Thus, the fabric in the panels 142c, 144c, 146c, 148c between the stitch lines 154c, 160c, 166c, 172c has been removed, except for the corner pieces 161 that are provided to support the overlapping connections together. The fabric in the panels 142c, 144c, 146c, 148c between the outer sides of the panels and the stitch lines 154c, 160c, 166c, 172c still remain, as indicated, for example, by the fabric 163 between the outer side 165 of panel 144c and stitch line 154c. The corner pieces 161 are optional, and can be triangular, as shown in FIG. 22, and can assume any other shape as desired, and can even be a strap or string.

A separate outer piece of enclosing fabric 141 extends around the periphery of the structure 140c, and in particular, around the outer sides (such as 165) of all the overlapped panels 142c, 144c, 146c, 148c. The fabric 141 can be attached (e.g., by stitching) to the outer sides of the panels 142c, 144c, 146c, 148c. Although the fabric 141 is illustrated in FIG. 22 as only extending along a middle section of the height of the panels 142c, 144c, 146c, 148c, it is possible for the fabric 141 to completely cover the panels 142c, 144c, 146c, 148c, as well as the top of the structure 140c.

Thus, the structure 140c provides an interior space that is greater than the interior space provided by structure 140 of FIG. 8. By essentially removing the fabric in the panels 142c, 144c, 146c, 148c between the stitch lines 154c, 160c, 166c, 172c, and providing an enclosing fabric 141, the interior space of the structure 140c is expanded to include the outer space defined by the fabric in the panels 142c, 144c, 146c, 148c between the outer sides (such as 165) of the panels and the stitch lines 154c, 160c, 166c, 172c. Structure 140c also provides an additional benefit in that the overlapping connections provide increased stability and support while not decreasing interior space. This can be contrasted to the situation if the structure 140 were to have its panels hingedly connected to each other. The hinged connections would result in greater interior space (when compared to structure 140 of FIG. 8), but may sacrifice some stability if the size of the structure is large. The structure 140c is particularly well-suited for use as a large camping tent, and a partition for use at trade shows, among other uses.

As an alternative, the enclosing fabric 141 can extend around some but not all of the panels 142c, 144c, 146c, 148c, thereby providing a walled enclosure at some regions of the structure 140c and an opened area at the other regions of the structure 140c.

The structure 140c can be folded and collapsed, as well as re-deployed to the fully expanded configuration, according to the same methods utilized for the structure 140 described above. The enclosing fabric 141 can be tucked between the panels 142c, 144c, 146c, 148c during the folding and collapsing steps, and folded and collapsed together.

Figure 23A:
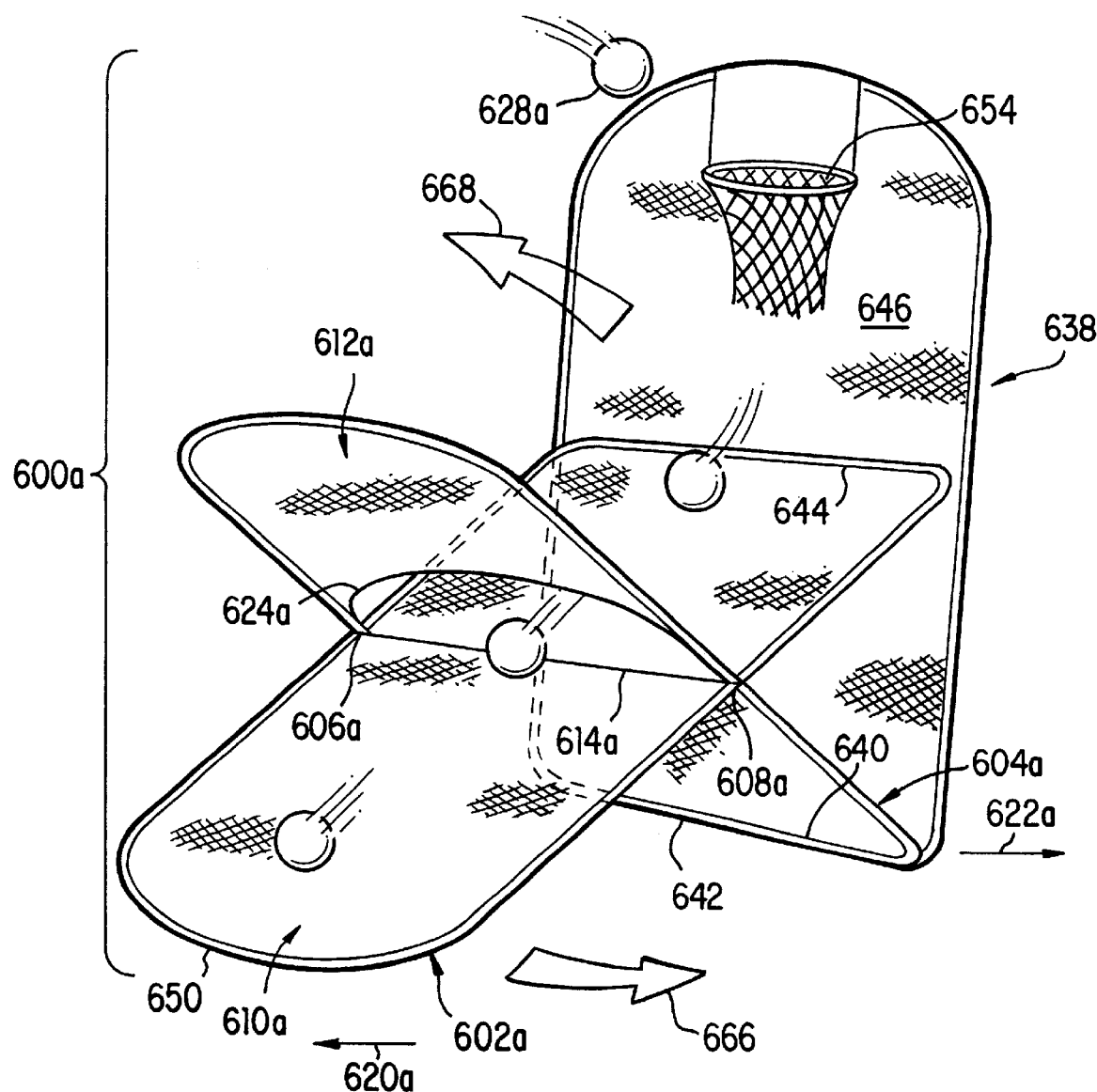
FIG. 23A is a perspective view of a structure according to another embodiment of the present invention illustrated in an expanded configuration.
Figure 23B:
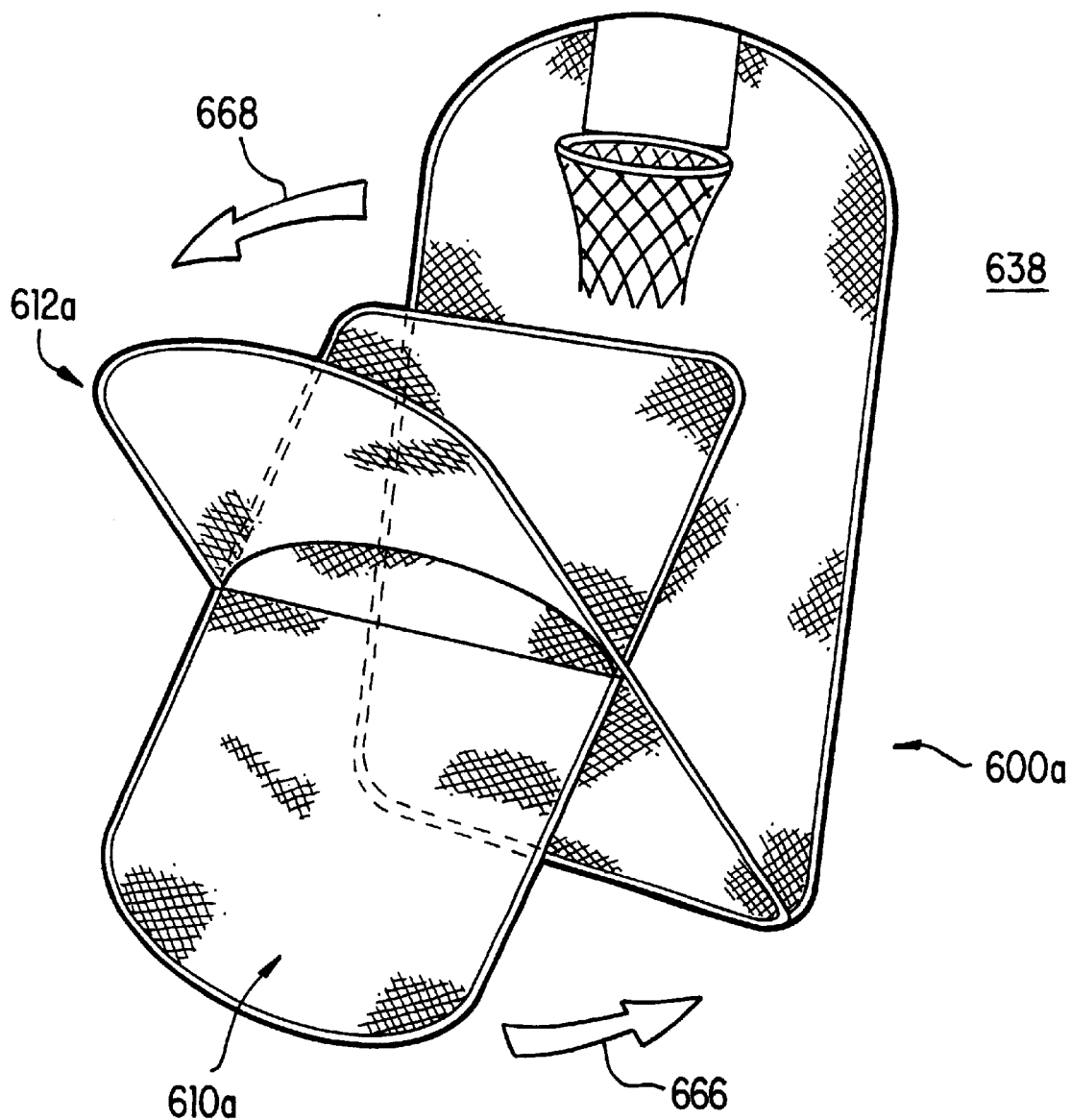
FIGS. 23B–23C illustrate how the different panels of the structure of FIG. 23A can be may be folded upon each other prior to twisting and folding for compact storage.
Figure 23C:
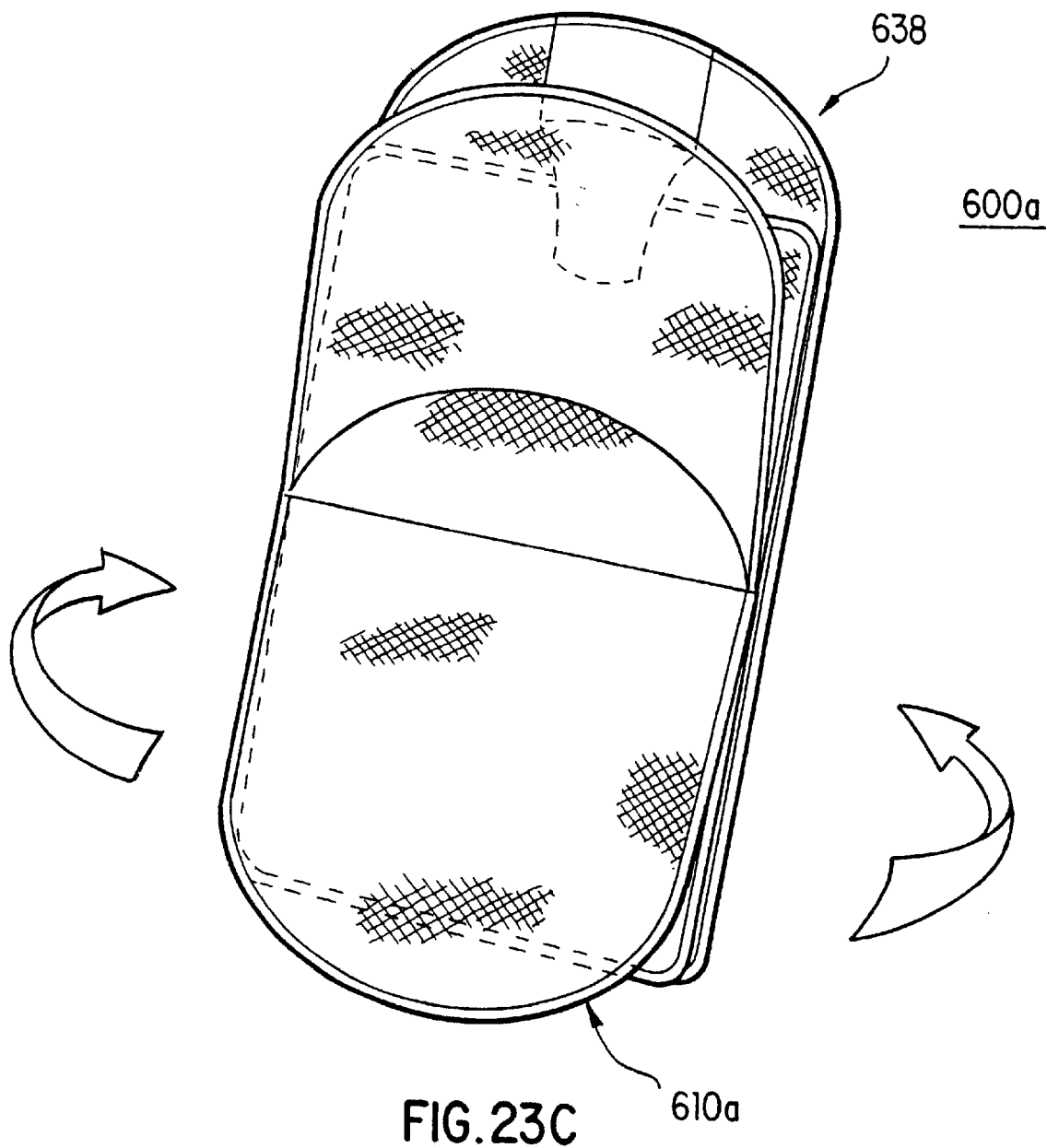

FIGS. 23A–23C illustrate an amusement structure 600a that is similar to the structure 600 of FIG. 17. The elements of the structure 600 that are the same as the elements of the structure 600a are provided with the same numeral designations except that an "a" has been added to the numeral designations in FIGS. 23A–23C. The structure 600a also has the two overlapping panels 610a and 612a that are essentially the same in orientation and construction as the panels 610 and 612, respectively. The first panel 610a and the second panel 612a are each defined by a separate loop member 602a, 604a, respectively, and are interconnected at overlapping points 606a, 608a and stitch line 614a by overlapping their respective loop members 602a, 604a in the manner described above, so that each panel 610a, 612a is angled with respect to each other. On the other hand, the supporting fabric pieces 616 and 618, and the pocket 626, are not provided in the structure 600a. The opening 624a can be curved, and can be provided in the second panel 612a adjacent the stitch line 614a.

Instead of the supporting fabric pieces 616 and 618, the structure 600a provides a rear support panel 638 that is coupled to the panels 610a, 612a. The rear support panel 638 can be constructed in the same manner as any of the other singular panels (such as panel 302) described herein. The lower edge 640 of the rear support panel 638 can be either removably attached (e.g., using removable attachment mechanisms such as hooks, loops, fasteners, Velcro™ pads) or hingedly attached (using one of the structures and methods illustrated in FIGS. 16A and 16B) to the lower edge 642 of the panel 612a, and the upper edge 644 of the panel 610a can be removably attached (e.g., using removable attachment mechanisms such as hooks, loops, fasteners, Velcro™ pads) to the fabric 646 of the rear support panel 638 at a pre-determined desired vertical level. The vertical position of the attachment of the upper edge 644 to the fabric 646 can be adjusted to define the limits to which the two panels 610a, 612a can be pivoted away from each other (i.e., pivoted away in the directions of arrows 620a, 622a). For example, positioning the upper edge 644 at a higher vertical level means that the lower edges 642 and 650 of the panels 612a and 610a, respectively, are spaced closer together, while positioning the upper edge 644 at a lower vertical level means that the lower edges 642 and 650 of the panels 612a and 610a, respectively, are spaced further apart from each other.

A basket or hoop 654 is suspended from the side of the fabric 646 that faces the panels 610a, 612a. In use, a ball 628a can be tossed at the basket 654. The ball 628a will either go through the basket 654, or hit the panel 610a, and then roll down the panel 610a since the panel 610a is angled. If the ball 628 rolls through the opening 624, it will continue to roll down the panel 610a and pass through the opening 624a to the ground.

The structure 600a can be collapsed in the following manner. First, as shown in FIGS. 23A and 23B, the lower edge 650 of the panel 610a and the rear support panel 638 are pushed towards each other as shown by the arrows 666 and 668. This pushing action is facilitated by the pivoting of the panels 610a, 612a along the stitch line 614a, and will cause the three panels 610a, 612a, 638 to overlie each other to form one stack of panels as shown in FIG. 23C. The folding and collapsing steps illustrated in FIGS. 5A–5E can be used to fold and collapse the structure 600a into a size which is a fraction of the original size of the structure.

FIG. 24 illustrates the application of the principles of the present invention to providing three overlapping or crossing loop members. The basic structure 800 in FIG. 24 has two basic crossing loops 802 and 804 that define two panels 810 and 812, respectively, in exactly the same manner that the loop members 602 and 604 define the two panels 610 and 612, respectively, in FIG. 17. In addition, the structure 800 provides a third loop member 806 that defines a third panel 814. The three loop members 802, 804, 806 overlap each other, and their respective fabrics 818, 820 and 822 are attached, using the same techniques described in connection with FIGS. 2, 2A, 2B, 2C and 3, with the same principles applied to three loop members and three panels instead of two loop members and two panels. The three loop members 802, 804, 806 overlap at two opposing overlapping points 826 and 828 that are positioned along opposing sides of each of the panels 810, 812, 814. The position of the overlapping points 826 and 828 can be anywhere along the sides of the panels 810, 812, 814.

The structure 800 can be collapsed by pushing all the panels 810, 812, 814 towards each other (see arrows 830 and 832) to form one stack of three panels 810, 812, 814. This pushing action is facilitated by the pivoting of the panels 810, 812, 814 along the stitch line 834, and will cause the three panels 810, 812, 814 to overlie each other to form one stack of panels. The folding and collapsing steps illustrated in FIGS. 5A–5E can be used to fold and collapse the structure 800 into a size which is a fraction of the original size of the structure.

As illustrated in the non-limiting embodiments and examples above, the principles of the present invention can be applied to a large variety of objects, including but not limited to sunshields, partitions, shade structures (which include tents), containers, sports structures, game structures and amusement structures. These structures can also be used as play structures (partitions, tents, shade structures, amusement games, etc.) for children and infants. When used for partitions, shade structures and containers, the fabric is preferably made from strong, lightweight materials and may include woven fabrics, sheet fabrics or even films. The fabric should be water-resistant and durable to withstand the wear and tear associated with rough treatment by children. The loop members can be made from the same materials described above for loop members 22 and 24.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A structure comprising:
   (a) a first panel and a second panel, each of the panels having:
      a flexible loop member defining a closed loop and having a first edge, a second edge and a bottom edge, the loop member adapted to assume an expanded position and a collapsed position; and
      a fabric that covers a portion of the loop member;
   (b) wherein the loop members of the first and second panels overlap each other at a first overlapping point along the first edges of the loop members of the first and second panels, and at a second overlapping point along the second edges of the loop members of the first and second panels, the fabric of the first panel crossing the fabric of the second panel, and the overlapping loop members defining a hinge portion about which the first and second loop members of the first and second panels are pivotable; and
   (c) wherein the bottom side of each panel contact a support surface when the loop members are in the expanded position.

2. The structure of claim 1, wherein the second panel is positioned at an angle with respect to the first panel.

3. The structure of claim 1, wherein the loop members are foldable on top of each other about their respective hinge portions to have the loop members overlaying each other, and wherein the overlaying loop members are collapsible to the collapsed positions by twisting and folding to form a plurality of concentric rings to substantially reduce the size of the structure in the collapsed position.

4. The structure of claim 1, wherein the hinge portion is positioned generally horizontally with respect to the support surface.

5. The structure of claim 1, wherein the hinge portion further includes a stitch line connecting the fabric of the two panels and extending from about the first overlapping point to about the second overlapping point.

6. The structure of claim 5, further including an opening provided in the second panel adjacent the stitch line.

7. The structure of claim 1, wherein each panel further includes a loop retaining portion provided along the fabric for retaining the respective loop member.

8. The structure of claim 1, further including a support piece coupled to the panels to define the limits to which the panels can pivot about the hinge portion.

9. The structure of claim 8, wherein the support piece is coupled to the first edges of the panels.

10. The structure of claim 8, wherein the support piece is a fabric piece.

11. The structure of claim 9, further including a second support piece coupled to the second edges of the panels.

12. The structure of claim 1, wherein the hinge portion defines an upper space between the panels and a lower space between the panels.

13. The structure of claim 12, wherein the lower space defines an enclosed space.

14. The structure of claim 1, further including a third panel having:
   a flexible loop member defining a closed loop and having a bottom edge, the loop member of the third panel adapted to assume an expanded position and a collapsed position; and
   a fabric that covers portions of the loop member of the third panel; and
   wherein the bottom edge of the loop member of the third panel is coupled to the bottom edge of the loop member of the first panel.

15. The structure of claim 14, wherein the second panel has a top edge that is coupled to the fabric of the third panel.

16. The structure of claim 15, further including a basket provided on the fabric of the third panel.

17. The structure of claim 15, wherein the top edge of the second panel is removably coupled to the fabric of the third panel.

18. The structure of claim 14, wherein the bottom edge of the third panel contacts the support surface when the loop members of the panels are in the expanded position.

19. A structure comprising:
   (a) a first panel, a second panel and a third panel, each of the panels having:
      a flexible loop member defining a closed loop and having a first edge and a second edge, the loop member adapted to assume an expanded position and a collapsed position; and
   (b) wherein the loop members of the first, second and third panels overlap each other at a first overlapping point along the first edges of the loop members of the first, second and third panels, and at a second overlapping point along the second edges of the loop members of the first, second and third panels, the overlapping loop members defining a hinge portion about which the loop members of the first, second and third panels are pivotable.

20. The structure of claim 19, wherein each panel includes a fabric that covers a portion of the loop member, and wherein the fabric of each panel crosses the fabric of the other panels.

21. The structure of claim 19, wherein each panel is positioned at an angle with respect to the other panels.

22. The structure of claim 19, wherein the loop members are foldable on top of each other about their respective hinge portions to have the loop members overlaying each other, and wherein the overlaying loop members are collapsible to the collapsed positions by twisting and folding to form a plurality of concentric rings to substantially reduce the size of the structure in the collapsed position.

23. The structure of claim 19, wherein the hinge portion further includes a stitch line connecting the fabric of the two panels and extending from about the first overlapping point to about the second overlapping point.

* * * * *